United States Patent
Dong et al.

(10) Patent No.: US 12,481,126 B2
(45) Date of Patent: Nov. 25, 2025

(54) OPTICAL IMAGING LENS

(71) Applicant: Genius Electronic Optical (Xiamen) Co., Ltd., Fujian (CN)

(72) Inventors: Chuanbo Dong, Fujian (CN); Hai Lin, Fujian (CN); Qingzhi Zhu, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 692 days.

(21) Appl. No.: 17/861,270

(22) Filed: Jul. 11, 2022

(65) Prior Publication Data

US 2023/0221533 A1    Jul. 13, 2023

(30) Foreign Application Priority Data

Jan. 12, 2022   (CN) .......................... 202210032698.X

(51) Int. Cl.
  *G02B 9/64* (2006.01)
  *G02B 13/00* (2006.01)

(52) U.S. Cl.
  CPC ........... *G02B 9/64* (2013.01); *G02B 13/0045* (2013.01)

(58) Field of Classification Search
  None
  See application file for complete search history.

(56) References Cited

U.S. PATENT DOCUMENTS

| | | | | |
|---|---|---|---|---|
| 2009/0273851 A1* | 11/2009 | Take | ................. | G02B 15/1461 359/755 |
| 2016/0085050 A1* | 3/2016 | Kunugise | ....... | G02B 15/143507 359/755 |
| 2020/0241243 A1* | 7/2020 | Hirano | .................... | G02B 15/14 |
| 2020/0285028 A1* | 9/2020 | Hirano | ..................... | G02B 9/64 |
| 2021/0149166 A1 | 5/2021 | Zhang | | |
| 2022/0075143 A1* | 3/2022 | Tian | .................... | G02B 13/0045 |
| 2022/0099941 A1* | 3/2022 | Yang | .................. | G02B 27/0025 |
| 2022/0196978 A1* | 6/2022 | Jhang | ....................... | G02B 9/64 |
| 2023/0161139 A1* | 5/2023 | Chen | ....................... | G02B 9/64 359/708 |

(Continued)

FOREIGN PATENT DOCUMENTS

| | | |
|---|---|---|
| CN | 111273428 A | 6/2020 |
| CN | 111766685 A | 10/2020 |
| CN | 111812821 A | 10/2020 |

(Continued)

*Primary Examiner* — Darryl J Collins
(74) *Attorney, Agent, or Firm* — Winston Hsu

(57) ABSTRACT

An optical imaging lens includes a first lens element to a ninth lens element from an object side to an image side along an optical axis and each lens element has an object-side surface and an image-side surface. A periphery region of the object-side surface of the fourth lens element is concave, an optical axis region of the image-side surface of the fourth lens element is convex, an optical axis region of the object-side surface of the seventh lens element is concave, an optical axis region of the image-side surface of the eighth lens element is concave, and an optical axis region of the object-side surface of the ninth lens element is concave. Lens elements included by the optical imaging lens are only nine lens elements described above. An Abbe number of the fifth lens element ν5 and an Abbe number of the ninth lens element ν9 satisfy ν5+ν9≤100.000.

19 Claims, 31 Drawing Sheets

(56) References Cited

U.S. PATENT DOCUMENTS

2024/0231052 A1\* 7/2024 Sin .................. G02B 13/18

FOREIGN PATENT DOCUMENTS

| CN | 113484984 A | 10/2021 |
| CN | 113552696 A | 10/2021 |
| CN | 113759523 A | 12/2021 |
| JP | 2020-64173 A | 4/2020 |
| KR | 10-2011-0064214 A | 6/2011 |
| TW | I745057 B | 11/2021 |

\* cited by examiner

Field of view
1.0

-0.24  0  0.072
(mm)

Longitudinal
spherical
aberration

Image Height
6.940(mm)

-0.3  0
(mm)

Sagittal
field
curvature

Image Height
6.940(mm)

-0.3  0  0.03
(mm)

Tangential
field
curvature

Image Height
6.940(mm)

0  3.5
(%)

Distortion

Field of view 1.0

-0.09　0　0.045
(mm)

Longitudinal spherical aberration

Image Height 6.977(mm)

-0.2　0
(mm)

Sagittal field curvature

Image Height 6.977(mm)

-0.2　0　0.2
(mm)

Tangential field curvature

Image Height 6.977(mm)

0　7
(%)

Distortion

Longitudinal spherical aberration

Sagittal field curvature

Tangential field curvature

Distortion

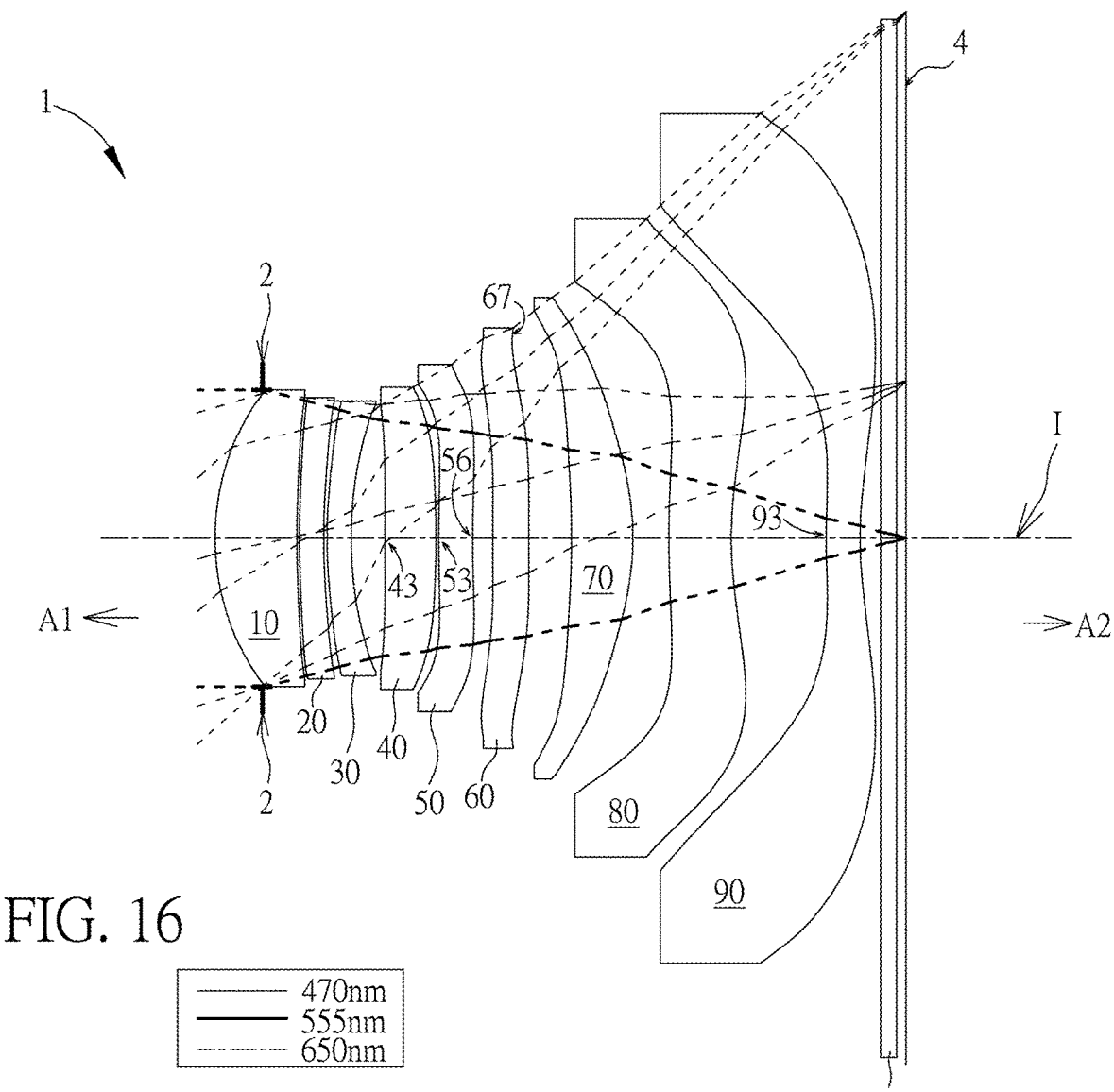
FIG. 16
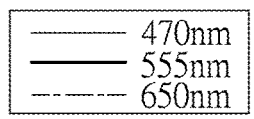
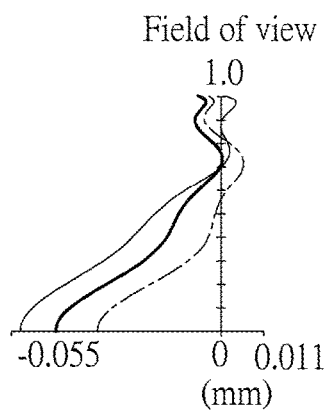
Field of view 1.0
-0.055  0  0.011
(mm)
Longitudinal spherical aberration
FIG. 17A
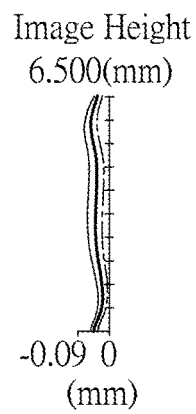
Image Height 6.500(mm)
-0.09  0
(mm)
Sagittal field curvature
FIG. 17B
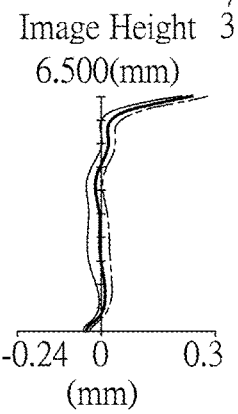
Image Height 6.500(mm)
-0.24  0  0.3
(mm)
Tangential field curvature
FIG. 17C
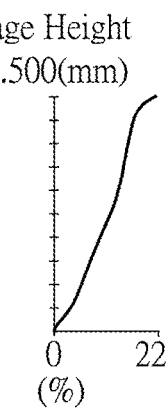
Image Height 6.500(mm)
0  22
(%)
Distortion
FIG. 17D

| First Embodiment |||||||
| --- ||||||||
| EFL=6.883mm, HFOV=42.147 Degrees, TTL=8.745mm, Fno=1.610, ImgH=6.940mm |||||||
| No. | | Radius of Curvature (mm) | Aperture Stop Distance/ Thickness/ Air Gap (mm) | | Refractive Index | Abbe No. | Focal Length (mm) |
|---|---|---|---|---|---|---|---|
|  | Object | Infinity | Infinity |  |  |  |  |
| 2 | Ape. Stop | Infinity | -0.803 |  |  |  |  |
| 11 | First Lens element | 3.040 | 1.013 | T1 | 1.545 | 55.987 | 7.219 |
| 12 |  | 11.704 | 0.036 | G12 |  |  |  |
| 21 | Second Lens element | 8.387 | 0.254 | T2 | 1.661 | 20.373 | -79.956 |
| 22 |  | 7.160 | 0.034 | G23 |  |  |  |
| 31 | Third Lens element | 6.617 | 0.254 | T3 | 1.661 | 20.373 | -58.177 |
| 32 |  | 5.567 | 0.478 | G34 |  |  |  |
| 41 | Fourth Lens element | 466.242 | 0.649 | T4 | 1.545 | 55.987 | 11.274 |
| 42 |  | -6.238 | 0.033 | G45 |  |  |  |
| 51 | Fifth Lens element | -14.042 | 0.266 | T5 | 1.661 | 20.373 | -82.678 |
| 52 |  | -18.981 | 0.210 | G56 |  |  |  |
| 61 | Sixth Lens element | 70.597 | 0.248 | T6 | 1.545 | 55.987 | -248.449 |
| 62 |  | 46.383 | 0.643 | G67 |  |  |  |
| 71 | Seventh Lens element | -4.754 | 1.055 | T7 | 1.545 | 55.987 | -79.096 |
| 72 |  | -5.761 | 0.119 | G78 |  |  |  |
| 81 | Eighth Lens element | 7.394 | 1.081 | T8 | 1.661 | 20.373 | -102.308 |
| 82 |  | 6.281 | 1.062 | G89 |  |  |  |
| 91 | Ninth Lens element | -8.124 | 0.659 | T9 | 1.545 | 55.987 | -7.030 |
| 92 |  | 7.492 | 0.379 | G9F |  |  |  |
| 3 | Filter | Infinity | 0.199 |  | 1.563 | 51.300 |  |
|  |  | Infinity | 0.076 |  |  |  |  |
| 4 | Image Plane | Infinity |  |  |  |  |  |

FIG. 24

| No. | K | $a_4$ | $a_6$ | $a_8$ | $a_{10}$ |
|---|---|---|---|---|---|
| 11 | 5.032334E-01 | -2.548825E-03 | -1.579016E-03 | 1.895165E-03 | -1.582164E-03 |
| 12 | 2.665965E+01 | -1.719227E-02 | -5.817654E-03 | 1.880488E-02 | -1.608920E-02 |
| 21 | 6.045014E+00 | -2.087249E-02 | -5.572742E-03 | 2.149281E-02 | -1.926162E-02 |
| 22 | 3.686867E+00 | -1.949620E-02 | -5.420139E-03 | 2.143029E-02 | -1.930272E-02 |
| 31 | 3.496916E+00 | -2.102416E-02 | -5.485688E-03 | 2.143468E-02 | -1.927295E-02 |
| 32 | 1.734838E+00 | -2.840076E-04 | -1.986209E-02 | 3.145166E-02 | -2.733159E-02 |
| 41 | 2.819384E+00 | -2.408400E-03 | -1.050591E-02 | 1.471238E-02 | -1.315462E-02 |
| 42 | -2.594185E+01 | 6.136988E-02 | -1.515576E-01 | 1.710305E-01 | -1.276266E-01 |
| 51 | 2.559189E+01 | 7.566906E-02 | -1.503095E-01 | 1.626536E-01 | -1.204477E-01 |
| 52 | 1.194052E+01 | 5.853863E-03 | -2.308678E-02 | 1.668979E-02 | -8.675392E-03 |
| 61 | -2.588510E+01 | -3.041825E-02 | 1.003910E-03 | -6.881821E-04 | 2.604617E-03 |
| 62 | 1.313906E+00 | -2.465110E-02 | 8.806917E-03 | -7.575622E-03 | 4.131702E-03 |
| 71 | 4.189040E+00 | 1.441155E-02 | 4.685712E-03 | -6.249473E-03 | 2.342492E-03 |
| 72 | -2.531377E+00 | 1.236725E-02 | -1.294547E-03 | -2.669785E-04 | -9.143999E-05 |
| 81 | 2.058301E+00 | -1.162597E-02 | -3.853215E-04 | 1.815017E-04 | -1.311022E-04 |
| 82 | -4.777156E-01 | -1.760488E-02 | 3.339687E-03 | -8.813453E-04 | 1.445641E-04 |
| 91 | -1.616073E+01 | -2.272983E-02 | 2.170681E-03 | -2.429765E-04 | 4.114217E-05 |
| 92 | -6.107497E+00 | -1.876409E-02 | 2.761059E-03 | -3.825672E-04 | 3.882334E-05 |
| No. | $a_{12}$ | $a_{14}$ | $a_{16}$ | $a_{18}$ | $a_{20}$ |
| 11 | 7.711595E-04 | -2.348142E-04 | 4.318132E-05 | -4.451734E-06 | 1.951730E-07 |
| 12 | 7.485465E-03 | -2.096490E-03 | 3.502925E-04 | -3.196557E-05 | 1.209687E-06 |
| 21 | 9.458691E-03 | -2.823550E-03 | 5.091238E-04 | -5.084342E-05 | 2.145224E-06 |
| 22 | 9.456723E-03 | -2.822421E-03 | 5.096873E-04 | -5.077688E-05 | 2.118287E-06 |
| 31 | 9.457941E-03 | -2.822169E-03 | 5.096783E-04 | -5.072225E-05 | 2.125614E-06 |
| 32 | 1.461183E-02 | -4.916960E-03 | 1.021914E-03 | -1.203283E-04 | 6.256367E-06 |
| 41 | 7.360680E-03 | -2.679105E-03 | 6.202458E-04 | -8.224689E-05 | 4.748578E-06 |
| 42 | 6.338636E-02 | -2.073695E-02 | 4.300923E-03 | -5.124556E-04 | 2.664946E-05 |
| 51 | 5.970192E-02 | -1.967751E-02 | 4.163122E-03 | -5.123279E-04 | 2.783328E-05 |
| 52 | 2.928038E-03 | -6.573171E-04 | 1.013232E-04 | -1.020375E-05 | 5.147691E-07 |
| 61 | -1.443190E-03 | 3.792125E-04 | -5.394214E-05 | 4.051244E-06 | -1.131887E-07 |
| 62 | -1.207711E-03 | 1.969064E-04 | -1.783175E-05 | 8.482983E-07 | -9.285227E-09 |
| 71 | -5.441160E-04 | 9.161924E-05 | -1.010044E-05 | 5.769685E-07 | -1.617497E-08 |
| 72 | 5.167723E-05 | -8.490916E-06 | 7.026861E-07 | -3.173426E-08 | 6.191410E-10 |
| 81 | 3.264729E-05 | -4.860128E-06 | 4.555731E-07 | -2.428112E-08 | 5.682920E-10 |
| 82 | -1.596927E-05 | 1.211158E-06 | -5.985264E-08 | 1.723879E-09 | -2.180300E-11 |
| 91 | -4.185451E-06 | 2.364246E-07 | -7.575643E-09 | 1.301660E-10 | -9.370000E-13 |
| 92 | -2.663286E-06 | 1.195809E-07 | -3.372192E-09 | 5.423100E-11 | -3.780000E-13 |

FIG. 25

| Second Embodiment ||||||
|---|---|---|---|---|---|
| | EFL=7.036mm, HFOV=43.016 Degrees, TTL=8.809mm, Fno=1.610, ImgH=6.977mm ||||||
| No. | | Radius of Curvature (mm) | Aperture Stop Distance/ Thickness/ Air Gap (mm) | Refractive Index | Abbe No. | Focal Length (mm) |
| | Object | Infinity | Infinity | | | |
| 2 | Ape. Stop | Infinity | -0.922 | | | |
| 11 | First Lens element | 3.053 | 1.123 | T1 | 1.545 | 55.987 | 7.225 |
| 12 | | 11.724 | 0.040 | G12 | | | |
| 21 | Second Lens element | 8.235 | 0.258 | T2 | 1.661 | 20.373 | -77.704 |
| 22 | | 7.017 | 0.038 | G23 | | | |
| 31 | Third Lens element | 6.475 | 0.257 | T3 | 1.661 | 20.373 | -48.748 |
| 32 | | 5.314 | 0.505 | G34 | | | |
| 41 | Fourth Lens element | -167.123 | 0.610 | T4 | 1.545 | 55.987 | 12.774 |
| 42 | | -6.707 | 0.036 | G45 | | | |
| 51 | Fifth Lens element | -15.091 | 0.261 | T5 | 1.661 | 20.373 | -37.895 |
| 52 | | -37.700 | 0.317 | G56 | | | |
| 61 | Sixth Lens element | 73.076 | 0.242 | T6 | 1.545 | 55.987 | -220.581 |
| 62 | | 45.436 | 0.548 | G67 | | | |
| 71 | Seventh Lens element | -5.170 | 0.946 | T7 | 1.545 | 55.987 | 179.913 |
| 72 | | -5.229 | 0.036 | G78 | | | |
| 81 | Eighth Lens element | 6.115 | 0.870 | T8 | 1.661 | 20.373 | 33.236 |
| 82 | | 7.962 | 1.163 | G89 | | | |
| 91 | Ninth Lens element | -7.062 | 0.901 | T9 | 1.545 | 55.987 | -6.206 |
| 92 | | 6.813 | 0.379 | G9F | | | |
| 3 | Filter | Infinity | 0.199 | | 1.563 | 51.300 | |
| | | Infinity | 0.079 | | | | |
| 4 | Image Plane | Infinity | | | | | |

FIG. 26

| No. | K | $a_4$ | $a_6$ | $a_8$ | $a_{10}$ |
|---|---|---|---|---|---|
| 11 | 5.032334E-01 | -1.316875E-03 | -1.680088E-03 | 1.934765E-03 | -1.579578E-03 |
| 12 | 2.665965E+01 | -1.639971E-02 | -5.763127E-03 | 1.881933E-02 | -1.609152E-02 |
| 21 | 6.045014E+00 | -1.980386E-02 | -5.546297E-03 | 2.150868E-02 | -1.925922E-02 |
| 22 | 3.686867E+00 | -1.985474E-02 | -5.372237E-03 | 2.141081E-02 | -1.929538E-02 |
| 31 | 3.496916E+00 | -2.154246E-02 | -5.680209E-03 | 2.147211E-02 | -1.926282E-02 |
| 32 | 1.734838E+00 | -6.061426E-04 | -1.903965E-02 | 3.136753E-02 | -2.733052E-02 |
| 41 | 2.819384E+00 | -1.384996E-03 | -1.116664E-02 | 1.486360E-02 | -1.313004E-02 |
| 42 | -2.594185E+01 | 6.383856E-02 | -1.518220E-01 | 1.709527E-01 | -1.276120E-01 |
| 51 | 2.559189E+01 | 7.390731E-02 | -1.502101E-01 | 1.626434E-01 | -1.204508E-01 |
| 52 | 1.194052E+01 | 6.635583E-03 | -2.316058E-02 | 1.669910E-02 | -8.679160E-03 |
| 61 | -2.588510E+01 | -2.844636E-02 | 6.471775E-04 | -6.914916E-04 | 2.604737E-03 |
| 62 | 1.313906E+00 | -2.691483E-02 | 9.609045E-03 | -7.567225E-03 | 4.129458E-03 |
| 71 | 4.189040E+00 | 1.484082E-02 | 6.093105E-03 | -6.251922E-03 | 2.259782E-03 |
| 72 | -2.531377E+00 | 1.506118E-02 | -1.502415E-03 | -2.684252E-04 | -9.274009E-05 |
| 81 | 2.058301E+00 | -6.378748E-03 | -1.285949E-03 | 3.913258E-04 | -1.465403E-04 |
| 82 | -4.777156E-01 | -1.359827E-02 | 3.221170E-03 | -8.840233E-04 | 1.447135E-04 |
| 91 | -1.616073E+01 | -2.268464E-02 | 2.172513E-03 | -2.429933E-04 | 4.114021E-05 |
| 92 | -6.107497E+00 | -1.662590E-02 | 2.731243E-03 | -3.841677E-04 | 3.885589E-05 |
| No. | $a_{12}$ | $a_{14}$ | $a_{16}$ | $a_{18}$ | $a_{20}$ |
| 11 | 7.711816E-04 | -2.346716E-04 | 4.321412E-05 | -4.451464E-06 | 1.960147E-07 |
| 12 | 7.485796E-03 | -2.096425E-03 | 3.503336E-04 | -3.196151E-05 | 1.208647E-06 |
| 21 | 9.457845E-03 | -2.823735E-03 | 5.090850E-04 | -5.083801E-05 | 2.146593E-06 |
| 22 | 9.455975E-03 | -2.822179E-03 | 5.096062E-04 | -5.080585E-05 | 2.118746E-06 |
| 31 | 9.459071E-03 | -2.822315E-03 | 5.096321E-04 | -5.073884E-05 | 2.116041E-06 |
| 32 | 1.461950E-02 | -4.916647E-03 | 1.021623E-03 | -1.204106E-04 | 6.277499E-06 |
| 41 | 7.358529E-03 | -2.680328E-03 | 6.199669E-04 | -8.227821E-05 | 4.761074E-06 |
| 42 | 6.339150E-02 | -2.073737E-02 | 4.300546E-03 | -5.125070E-04 | 2.665971E-05 |
| 51 | 5.970269E-02 | -1.967753E-02 | 4.163035E-03 | -5.123747E-04 | 2.785366E-05 |
| 52 | 2.927165E-03 | -6.570628E-04 | 1.015528E-04 | -1.015723E-05 | 5.038898E-07 |
| 61 | -1.440342E-03 | 3.783583E-04 | -5.390639E-05 | 4.030136E-06 | -1.224401E-07 |
| 62 | -1.209165E-03 | 1.974477E-04 | -1.788738E-05 | 8.319242E-07 | -1.603270E-08 |
| 71 | -5.293985E-04 | 8.986554E-05 | -1.012775E-05 | 6.560902E-07 | -2.085342E-08 |
| 72 | 5.159781E-05 | -8.449387E-06 | 6.995106E-07 | -3.140009E-08 | 6.292480E-10 |
| 81 | 3.289745E-05 | -4.879860E-06 | 4.575176E-07 | -2.408894E-08 | 5.337600E-10 |
| 82 | -1.597883E-05 | 1.210711E-06 | -5.984370E-08 | 1.723239E-09 | -2.175900E-11 |
| 91 | -4.185419E-06 | 2.364291E-07 | -7.575634E-09 | 1.301690E-10 | -9.370000E-13 |
| 92 | -2.664470E-06 | 1.195843E-07 | -3.372104E-09 | 5.425000E-11 | -3.780000E-13 |

FIG. 27

| Third Embodiment |||||||
|---|---|---|---|---|---|---|
| EFL=6.071mm, HFOV=42.147 Degrees, TTL=8.220mm, Fno=1.610, ImgH=6.755mm |||||||
| No. | | Radius of Curvature (mm) | Aperture Stop Distance/ Thickness/ Air Gap (mm) | | Refractive Index | Abbe No. | Focal Length (mm) |
| | Object | Infinity | Infinity | | | | |
| 2 | Ape. Stop | Infinity | -0.589 | | | | |
| 11 | First Lens element | 3.212 | 1.044 | T1 | 1.545 | 55.987 | 7.869 |
| 12 | | 11.252 | 0.050 | G12 | | | |
| 21 | Second Lens element | 8.264 | 0.295 | T2 | 1.661 | 20.373 | 441.005 |
| 22 | | 8.381 | 0.029 | G23 | | | |
| 31 | Third Lens element | 6.121 | 0.255 | T3 | 1.661 | 20.373 | 312.762 |
| 32 | | 6.201 | 0.556 | G34 | | | |
| 41 | Fourth Lens element | -36.550 | 0.678 | T4 | 1.545 | 55.987 | 21.789 |
| 42 | | -9.038 | 0.043 | G45 | | | |
| 51 | Fifth Lens element | -18.712 | 0.412 | T5 | 1.661 | 20.373 | -19.367 |
| 52 | | 42.112 | 0.140 | G56 | | | |
| 61 | Sixth Lens element | 40.498 | 0.495 | T6 | 1.545 | 55.987 | 76.229 |
| 62 | | 1468.383 | 0.536 | G67 | | | |
| 71 | Seventh Lens element | -13.992 | 0.810 | T7 | 1.545 | 55.987 | 6.921 |
| 72 | | -3.037 | 0.039 | G78 | | | |
| 81 | Eighth Lens element | 9.915 | 0.551 | T8 | 1.661 | 20.373 | -19.984 |
| 82 | | 5.560 | 1.120 | G89 | | | |
| 91 | Ninth Lens element | -7.465 | 0.476 | T9 | 1.545 | 55.987 | -5.410 |
| 92 | | 5.003 | 0.379 | G9F | | | |
| 3 | Filter | Infinity | 0.199 | | 1.563 | 51.300 | |
| | | Infinity | 0.112 | | | | |
| 4 | Image Plane | Infinity | | | | | |

FIG. 28

| No. | K | $a_4$ | $a_6$ | $a_8$ | $a_{10}$ |
|---|---|---|---|---|---|
| 11 | 4.921763E-01 | -2.302262E-03 | -1.575062E-03 | 1.947975E-03 | -1.580748E-03 |
| 12 | 2.650114E+01 | -1.652056E-02 | -5.441331E-03 | 1.880996E-02 | -1.610014E-02 |
| 21 | 6.193350E+00 | -1.914369E-02 | -5.667885E-03 | 2.150782E-02 | -1.926290E-02 |
| 22 | 3.809848E+00 | -2.056143E-02 | -5.497231E-03 | 2.143955E-02 | -1.927596E-02 |
| 31 | 3.786681E+00 | -2.044521E-02 | -5.381043E-03 | 2.150144E-02 | -1.927555E-02 |
| 32 | 5.538296E-01 | 1.259211E-03 | -1.934598E-02 | 3.124809E-02 | -2.735430E-02 |
| 41 | -5.048787E+01 | -4.825545E-03 | -1.115517E-02 | 1.497311E-02 | -1.313499E-02 |
| 42 | -1.473147E+01 | 6.610684E-02 | -1.529847E-01 | 1.708271E-01 | -1.276134E-01 |
| 51 | -1.632454E+00 | 6.927798E-02 | -1.503805E-01 | 1.626341E-01 | -1.204504E-01 |
| 52 | -6.429944E+00 | 2.079812E-03 | -2.217390E-02 | 1.679872E-02 | -8.681345E-03 |
| 61 | 5.035091E+01 | -2.571705E-02 | 5.355048E-04 | -7.661395E-04 | 2.595192E-03 |
| 62 | -5.023954E+01 | -2.421700E-02 | 9.659529E-03 | -7.499975E-03 | 4.133657E-03 |
| 71 | 4.730911E+00 | -2.854530E-03 | 9.332681E-03 | -6.357745E-03 | 2.230143E-03 |
| 72 | -3.462371E+00 | 1.707439E-02 | -1.462276E-03 | -2.801284E-04 | -9.325618E-05 |
| 81 | 1.858273E+00 | -3.299288E-03 | -2.034866E-03 | 4.386011E-04 | -1.439278E-04 |
| 82 | -1.018290E+00 | -1.907442E-02 | 3.506014E-03 | -8.866852E-04 | 1.447770E-04 |
| 91 | -1.560836E+01 | -2.242337E-02 | 2.165885E-03 | -2.431547E-04 | 4.113703E-05 |
| 92 | -4.884259E+00 | -1.719881E-02 | 2.755970E-03 | -3.836898E-04 | 3.886641E-05 |
| No. | $a_{12}$ | $a_{14}$ | $a_{16}$ | $a_{18}$ | $a_{20}$ |
| 11 | 7.708053E-04 | -2.345771E-04 | 4.323417E-05 | -4.448071E-06 | 1.939957E-07 |
| 12 | 7.483370E-03 | -2.096629E-03 | 3.502640E-04 | -3.197710E-05 | 1.207125E-06 |
| 21 | 9.456400E-03 | -2.823759E-03 | 5.091685E-04 | -5.081190E-05 | 2.149042E-06 |
| 22 | 9.460036E-03 | -2.821889E-03 | 5.095257E-04 | -5.081263E-05 | 2.141979E-06 |
| 31 | 9.455944E-03 | -2.822341E-03 | 5.098369E-04 | -5.068668E-05 | 2.119457E-06 |
| 32 | 1.461555E-02 | -4.917826E-03 | 1.021230E-03 | -1.203971E-04 | 6.349956E-06 |
| 41 | 7.349645E-03 | -2.682822E-03 | 6.196867E-04 | -8.216916E-05 | 4.837133E-06 |
| 42 | 6.339013E-02 | -2.073841E-02 | 4.300243E-03 | -5.125327E-04 | 2.670499E-05 |
| 51 | 5.970000E-02 | -1.967841E-02 | 4.162899E-03 | -5.123605E-04 | 2.786433E-05 |
| 52 | 2.924538E-03 | -6.572226E-04 | 1.015736E-04 | -1.015576E-05 | 5.025980E-07 |
| 61 | -1.440875E-03 | 3.784297E-04 | -5.388717E-05 | 4.032386E-06 | -1.237889E-07 |
| 62 | -1.209762E-03 | 1.973189E-04 | -1.789753E-05 | 8.329385E-07 | -1.525161E-08 |
| 71 | -5.322723E-04 | 8.973582E-05 | -1.011437E-05 | 6.631084E-07 | -1.866838E-08 |
| 72 | 5.160121E-05 | -8.448806E-06 | 6.995647E-07 | -3.139967E-08 | 6.291110E-10 |
| 81 | 3.292411E-05 | -4.883207E-06 | 4.573349E-07 | -2.408074E-08 | 5.361850E-10 |
| 82 | -1.597219E-05 | 1.211030E-06 | -5.985589E-08 | 1.722430E-09 | -2.179100E-11 |
| 91 | -4.185460E-06 | 2.364299E-07 | -7.575648E-09 | 1.301670E-10 | -9.370000E-13 |
| 92 | -2.664519E-06 | 1.195795E-07 | -3.372317E-09 | 5.423900E-11 | -3.790000E-13 |

FIG. 29

| Fourth Embodiment |||||||
|---|---|---|---|---|---|---|
| EFL=7.003mm, HFOV=42.155 Degrees, TTL=8.899mm, Fno=1.610, ImgH=6.667mm |||||||
| No. | | Radius of Curvature (mm) | Aperture Stop Distance/ Thickness/ Air Gap (mm) | | Refractive Index | Abbe No. | Focal Length (mm) |
| | Object | Infinity | Infinity | | | | |
| 2 | Ape. Stop | Infinity | -0.922 | | | | |
| 11 | First Lens element | 3.135 | 1.123 | T1 | 1.545 | 55.987 | 7.482 |
| 12 | | 11.759 | 0.034 | G12 | | | |
| 21 | Second Lens element | 8.666 | 0.291 | T2 | 1.661 | 20.373 | -55.901 |
| 22 | | 6.937 | 0.053 | G23 | | | |
| 31 | Third Lens element | 5.984 | 0.257 | T3 | 1.661 | 20.373 | -43.119 |
| 32 | | 4.869 | 0.655 | G34 | | | |
| 41 | Fourth Lens element | -27.888 | 0.323 | T4 | 1.545 | 55.987 | -269.805 |
| 42 | | -34.538 | 0.038 | G45 | | | |
| 51 | Fifth Lens element | 58.559 | 0.547 | T5 | 1.567 | 37.533 | 65.318 |
| 52 | | -101.779 | 0.183 | G56 | | | |
| 61 | Sixth Lens element | 31.113 | 0.485 | T6 | 1.545 | 55.987 | 93.648 |
| 62 | | 78.972 | 0.662 | G67 | | | |
| 71 | Seventh Lens element | -11.319 | 0.684 | T7 | 1.545 | 55.987 | 7.327 |
| 72 | | -3.020 | 0.127 | G78 | | | |
| 81 | Eighth Lens element | 9.225 | 0.543 | T8 | 1.661 | 20.373 | -21.847 |
| 82 | | 5.516 | 1.273 | G89 | | | |
| 91 | Ninth Lens element | -6.711 | 0.676 | T9 | 1.545 | 55.987 | -6.078 |
| 92 | | 6.806 | 0.379 | G9F | | | |
| 3 | Filter | Infinity | 0.199 | | 1.563 | 51.300 | |
| | | Infinity | 0.366 | | | | |
| 4 | Image Plane | Infinity | | | | | |

FIG. 30

| No. | K | $a_4$ | $a_6$ | $a_8$ | $a_{10}$ |
|---|---|---|---|---|---|
| 11 | 4.987859E-01 | -7.006956E-04 | -1.536344E-03 | 1.956177E-03 | -1.578420E-03 |
| 12 | 2.683616E+01 | -1.681442E-02 | -5.455002E-03 | 1.882746E-02 | -1.609834E-02 |
| 21 | 4.691568E+00 | -1.920627E-02 | -5.270630E-03 | 2.149116E-02 | -1.926137E-02 |
| 22 | 4.481634E+00 | -1.969982E-02 | -5.616141E-03 | 2.144061E-02 | -1.926280E-02 |
| 31 | 3.243345E+00 | -2.078566E-02 | -5.738662E-03 | 2.147939E-02 | -1.927037E-02 |
| 32 | 1.672817E+00 | 7.225053E-04 | -1.839729E-02 | 3.131849E-02 | -2.735386E-02 |
| 41 | 5.006172E+01 | -3.943845E-03 | -1.191896E-02 | 1.535861E-02 | -1.319723E-02 |
| 42 | 4.815973E+01 | 6.252200E-02 | -1.527786E-01 | 1.709806E-01 | -1.275884E-01 |
| 51 | -2.206382E+00 | 6.892489E-02 | -1.511985E-01 | 1.628033E-01 | -1.204252E-01 |
| 52 | -5.112232E+01 | 3.701045E-03 | -2.242267E-02 | 1.674105E-02 | -8.705367E-03 |
| 61 | -1.295698E+01 | -2.488531E-02 | 5.120826E-04 | -7.448962E-04 | 2.601993E-03 |
| 62 | -5.142912E+01 | -2.513549E-02 | 9.562845E-03 | -7.518164E-03 | 4.132623E-03 |
| 71 | 7.550928E+00 | -1.603220E-03 | 9.287238E-03 | -6.339170E-03 | 2.231080E-03 |
| 72 | -2.918970E+00 | 1.571401E-02 | -1.450552E-03 | -2.712976E-04 | -9.266786E-05 |
| 81 | 2.954502E+00 | -2.846285E-03 | -1.974497E-03 | 4.369266E-04 | -1.421709E-04 |
| 82 | -2.935271E-01 | -1.914252E-02 | 3.506884E-03 | -8.870023E-04 | 1.446307E-04 |
| 91 | -1.414855E+01 | -2.209467E-02 | 2.167015E-03 | -2.438314E-04 | 4.116780E-05 |
| 92 | -3.979427E+00 | -1.784393E-02 | 2.743941E-03 | -3.834092E-04 | 3.888073E-05 |
| No. | $a_{12}$ | $a_{14}$ | $a_{16}$ | $a_{18}$ | $a_{20}$ |
| 11 | 7.715883E-04 | -2.345218E-04 | 4.325578E-05 | -4.442595E-06 | 1.940161E-07 |
| 12 | 7.485900E-03 | -2.096342E-03 | 3.502115E-04 | -3.193045E-05 | 1.207305E-06 |
| 21 | 9.458550E-03 | -2.823676E-03 | 5.091235E-04 | -5.082447E-05 | 2.151139E-06 |
| 22 | 9.455605E-03 | -2.822589E-03 | 5.097256E-04 | -5.070477E-05 | 2.091830E-06 |
| 31 | 9.457572E-03 | -2.822303E-03 | 5.096878E-04 | -5.077480E-05 | 2.097139E-06 |
| 32 | 1.462049E-02 | -4.917065E-03 | 1.020894E-03 | -1.202623E-04 | 6.266234E-06 |
| 41 | 7.327453E-03 | -2.673897E-03 | 6.192684E-04 | -8.238363E-05 | 4.820920E-06 |
| 42 | 6.339291E-02 | -2.073926E-02 | 4.300066E-03 | -5.122863E-04 | 2.667056E-05 |
| 51 | 5.969748E-02 | -1.967791E-02 | 4.162829E-03 | -5.124365E-04 | 2.789986E-05 |
| 52 | 2.921827E-03 | -6.567632E-04 | 1.017067E-04 | -1.013667E-05 | 4.905498E-07 |
| 61 | -1.440018E-03 | 3.784584E-04 | -5.390566E-05 | 4.026690E-06 | -1.243885E-07 |
| 62 | -1.209785E-03 | 1.973131E-04 | -1.789801E-05 | 8.331278E-07 | -1.520249E-08 |
| 71 | -5.321568E-04 | 8.973989E-05 | -1.010427E-05 | 6.613603E-07 | -1.855124E-08 |
| 72 | 5.161875E-05 | -8.452208E-06 | 6.992674E-07 | -3.139199E-08 | 6.356650E-10 |
| 81 | 3.264903E-05 | -4.874960E-06 | 4.572848E-07 | -2.410307E-08 | 5.373520E-10 |
| 82 | -1.597738E-05 | 1.210880E-06 | -5.983383E-08 | 1.723023E-09 | -2.179000E-11 |
| 91 | -4.185643E-06 | 2.364319E-07 | -7.575558E-09 | 1.301690E-10 | -9.370000E-13 |
| 92 | -2.664304E-06 | 1.195795E-07 | -3.372303E-09 | 5.424400E-11 | -3.790000E-13 |

FIG. 31

| | | | Fifth Embodiment | | | |
|---|---|---|---|---|---|---|
| | EFL=6.490mm, HFOV=41.940 Degrees, TTL=8.718mm, Fno=1.610, ImgH=6.500mm | | | | | |
| No. | | Radius of Curvature (mm) | Aperture Stop Distance/ Thickness/ Air Gap (mm) | | Refractive Index | Abbe No. | Focal Length (mm) |
| | Object | Infinity | Infinity | | | | |
| 2 | Ape. Stop | Infinity | -0.576 | | | | |
| 11 | First Lens element | 3.284 | 0.829 | T1 | 1.545 | 55.987 | 8.065 |
| 12 | | 11.754 | 0.023 | G12 | | | |
| 21 | Second Lens element | 9.793 | 0.291 | T2 | 1.661 | 20.373 | -47.912 |
| 22 | | 7.407 | 0.053 | G23 | | | |
| 31 | Third Lens element | 5.832 | 0.292 | T3 | 1.661 | 20.373 | -53.823 |
| 32 | | 4.917 | 0.574 | G34 | | | |
| 41 | Fourth Lens element | -16.345 | 0.481 | T4 | 1.545 | 55.987 | 14.126 |
| 42 | | -5.296 | 0.049 | G45 | | | |
| 51 | Fifth Lens element | -109.738 | 0.359 | T5 | 1.661 | 20.373 | -21.477 |
| 52 | | 16.501 | 0.297 | G56 | | | |
| 61 | Sixth Lens element | 48.128 | 0.439 | T6 | 1.545 | 55.987 | 141.220 |
| 62 | | 127.543 | 0.676 | G67 | | | |
| 71 | Seventh Lens element | -6.104 | 0.704 | T7 | 1.545 | 55.987 | 7.976 |
| 72 | | -2.646 | 0.050 | G78 | | | |
| 81 | Eighth Lens element | 13.262 | 0.773 | T8 | 1.642 | 22.409 | 851.708 |
| 82 | | 13.278 | 1.549 | G89 | | | |
| 91 | Ninth Lens element | -5.300 | 0.506 | T9 | 1.642 | 22.409 | -4.703 |
| 92 | | 7.420 | 0.379 | G9F | | | |
| 3 | Filter | Infinity | 0.199 | | 1.563 | 51.300 | |
| | | Infinity | 0.193 | | | | |
| 4 | Image Plane | Infinity | | | | | |

FIG. 32

| No. | K | $a_4$ | $a_6$ | $a_8$ | $a_{10}$ |
|---|---|---|---|---|---|
| 11 | 5.544381E-01 | 6.491917E-05 | -1.487124E-03 | 1.997030E-03 | -1.574367E-03 |
| 12 | 2.605926E+01 | -1.493071E-02 | -5.273253E-03 | 1.884159E-02 | -1.609188E-02 |
| 21 | 9.115109E+00 | -1.754641E-02 | -5.530978E-03 | 2.153931E-02 | -1.925725E-02 |
| 22 | 5.292556E+00 | -1.991604E-02 | -5.357770E-03 | 2.146329E-02 | -1.926889E-02 |
| 31 | 2.483397E+00 | -2.156851E-02 | -5.507153E-03 | 2.153122E-02 | -1.927297E-02 |
| 32 | 1.351996E+00 | 2.515882E-04 | -1.885419E-02 | 3.128678E-02 | -2.734646E-02 |
| 41 | -7.655509E+00 | -4.208881E-04 | -1.260465E-02 | 1.474811E-02 | -1.311779E-02 |
| 42 | -1.666124E+01 | 6.403776E-02 | -1.525555E-01 | 1.709357E-01 | -1.275990E-01 |
| 51 | 0.000000E+00 | 6.360948E-02 | -1.504993E-01 | 1.627133E-01 | -1.204354E-01 |
| 52 | -6.218419E+01 | -3.927021E-03 | -2.236431E-02 | 1.678652E-02 | -8.690566E-03 |
| 61 | 2.289546E+01 | -2.489699E-02 | 6.271232E-04 | -7.440596E-04 | 2.601766E-03 |
| 62 | -6.206202E+01 | -2.665423E-02 | 9.494365E-03 | -7.510288E-03 | 4.133258E-03 |
| 71 | 1.983154E+00 | 4.076386E-04 | 9.183877E-03 | -6.329235E-03 | 2.229971E-03 |
| 72 | -1.247937E+00 | 1.703908E-02 | -1.455393E-03 | -2.869328E-04 | -9.406023E-05 |
| 81 | 1.534030E+01 | -2.355659E-05 | -2.168330E-03 | 4.599317E-04 | -1.440912E-04 |
| 82 | 1.248891E+01 | -1.609059E-02 | 3.388318E-03 | -9.037964E-04 | 1.443762E-04 |
| 91 | 0.000000E+00 | -2.131401E-02 | 2.201570E-03 | -2.630779E-04 | 4.018892E-05 |
| 92 | -4.398625E+00 | -1.782037E-02 | 2.741749E-03 | -3.824845E-04 | 3.884987E-05 |
| No. | $a_{12}$ | $a_{14}$ | $a_{16}$ | $a_{18}$ | $a_{20}$ |
| 11 | 7.718842E-04 | -2.343625E-04 | 4.330188E-05 | -4.435509E-06 | 1.943634E-07 |
| 12 | 7.486189E-03 | -2.096281E-03 | 3.504097E-04 | -3.195151E-05 | 1.205313E-06 |
| 21 | 9.457954E-03 | -2.823644E-03 | 5.091722E-04 | -5.081971E-05 | 2.150323E-06 |
| 22 | 9.460517E-03 | -2.822073E-03 | 5.095015E-04 | -5.079784E-05 | 2.138581E-06 |
| 31 | 9.458237E-03 | -2.822077E-03 | 5.096193E-04 | -5.079948E-05 | 2.104360E-06 |
| 32 | 1.461330E-02 | -4.917454E-03 | 1.021945E-03 | -1.202626E-04 | 6.175592E-06 |
| 41 | 7.366526E-03 | -2.678883E-03 | 6.198005E-04 | -8.238453E-05 | 4.803906E-06 |
| 42 | 6.339342E-02 | -2.073729E-02 | 4.300582E-03 | -5.124844E-04 | 2.666909E-05 |
| 51 | 5.969995E-02 | -1.967941E-02 | 4.162514E-03 | -5.124297E-04 | 2.787665E-05 |
| 52 | 2.922969E-03 | -6.574310E-04 | 1.015484E-04 | -1.015992E-05 | 4.995724E-07 |
| 61 | -1.440088E-03 | 3.784211E-04 | -5.390626E-05 | 4.026255E-06 | -1.242518E-07 |
| 62 | -1.209776E-03 | 1.973109E-04 | -1.789846E-05 | 8.330519E-07 | -1.520995E-08 |
| 71 | -5.323638E-04 | 8.972870E-05 | -1.011549E-05 | 6.633180E-07 | -1.861575E-08 |
| 72 | 5.139379E-05 | -8.476212E-06 | 6.971781E-07 | -3.148085E-08 | 6.499220E-10 |
| 81 | 3.288637E-05 | -4.894167E-06 | 4.564888E-07 | -2.413194E-08 | 5.381990E-10 |
| 82 | -1.596686E-05 | 1.211946E-06 | -5.977729E-08 | 1.725686E-09 | -2.175900E-11 |
| 91 | -4.204004E-06 | 2.375878E-07 | -7.431609E-09 | 1.451840E-10 | 2.980000E-13 |
| 92 | -2.664274E-06 | 1.195718E-07 | -3.372437E-09 | 5.425000E-11 | -3.790000E-13 |

FIG. 33

| | | Sixth Embodiment | | | | |
|---|---|---|---|---|---|---|
| | EFL=5.918mm, HFOV=41.907 Degrees, TTL=8.549mm, Fno=1.610, ImgH=6.500mm | | | | | |
| No. | | Radius of Curvature (mm) | Aperture Stop Distance/ Thickness/ Air Gap (mm) | | Refractive Index | Abbe No. | Focal Length (mm) |
| | Object | Infinity | Infinity | | | | |
| 2 | Ape. Stop | Infinity | -0.583 | | | | |
| 11 | First Lens element | 3.131 | 1.015 | T1 | 1.545 | 55.987 | 7.504 |
| 12 | | 11.743 | 0.033 | G12 | | | |
| 21 | Second Lens element | 10.676 | 0.299 | T2 | 1.661 | 20.373 | -54.295 |
| 22 | | 8.153 | 0.041 | G23 | | | |
| 31 | Third Lens element | 6.289 | 0.299 | T3 | 1.661 | 20.373 | -39.951 |
| 32 | | 4.992 | 0.417 | G34 | | | |
| 41 | Fourth Lens element | -191.645 | 0.628 | T4 | 1.545 | 55.987 | 17.961 |
| 42 | | -9.345 | 0.037 | G45 | | | |
| 51 | Fifth Lens element | 194.394 | 0.418 | T5 | 1.661 | 20.373 | -31.206 |
| 52 | | 18.788 | 0.246 | G56 | | | |
| 61 | Sixth Lens element | 32.600 | 0.447 | T6 | 1.545 | 55.987 | 104.572 |
| 62 | | 75.567 | 0.531 | G67 | | | |
| 71 | Seventh Lens element | -12.754 | 0.761 | T7 | 1.545 | 55.987 | 7.404 |
| 72 | | -3.136 | 0.444 | G78 | | | |
| 81 | Eighth Lens element | 15.088 | 0.769 | T8 | 1.642 | 22.409 | -11.444 |
| 82 | | 4.869 | 1.177 | G89 | | | |
| 91 | Ninth Lens element | 5.581 | 0.421 | T9 | 1.545 | 55.987 | 1000.080 |
| 92 | | 5.489 | 0.250 | G9F | | | |
| 3 | Filter | Infinity | 0.199 | | 1.563 | 51.300 | |
| | | Infinity | 0.116 | | | | |
| 4 | Image Plane | Infinity | | | | | |

FIG. 34

| No. | K | $a_4$ | $a_6$ | $a_8$ | $a_{10}$ |
|---|---|---|---|---|---|
| 11 | 4.859270E-01 | -3.946961E-04 | -1.581340E-03 | 1.978533E-03 | -1.574805E-03 |
| 12 | 2.570876E+01 | -1.624412E-02 | -5.229157E-03 | 1.883600E-02 | -1.609595E-02 |
| 21 | 5.150715E+00 | -1.819810E-02 | -5.453656E-03 | 2.157868E-02 | -1.924819E-02 |
| 22 | 4.211519E+00 | -1.953484E-02 | -5.223112E-03 | 2.147382E-02 | -1.926653E-02 |
| 31 | 2.961891E+00 | -2.006028E-02 | -5.369524E-03 | 2.151017E-02 | -1.928366E-02 |
| 32 | 1.566708E+00 | 1.905750E-03 | -1.874064E-02 | 3.131614E-02 | -2.733935E-02 |
| 41 | 6.089718E+01 | 2.175287E-05 | -1.150278E-02 | 1.493724E-02 | -1.312035E-02 |
| 42 | -6.948889E+01 | 6.747369E-02 | -1.525171E-01 | 1.709540E-01 | -1.275826E-01 |
| 51 | -5.116889E+02 | 7.041266E-02 | -1.504315E-01 | 1.627269E-01 | -1.204329E-01 |
| 52 | 3.096779E+01 | 4.524237E-04 | -2.229810E-02 | 1.675158E-02 | -8.693924E-03 |
| 61 | 1.343944E+01 | -2.446582E-02 | 5.454486E-04 | -7.476672E-04 | 2.602108E-03 |
| 62 | -3.143172E+01 | -2.579494E-02 | 9.592545E-03 | -7.511651E-03 | 4.133012E-03 |
| 71 | 3.157799E+00 | -6.109822E-05 | 9.241569E-03 | -6.345546E-03 | 2.231185E-03 |
| 72 | -1.475088E+00 | 1.917787E-02 | -1.411910E-03 | -2.849580E-04 | -9.309065E-05 |
| 81 | 1.670125E+01 | -4.818065E-03 | -2.444953E-03 | 4.414626E-04 | -1.431989E-04 |
| 82 | -1.787214E+00 | -1.995749E-02 | 3.502072E-03 | -8.878228E-04 | 1.447432E-04 |
| 91 | -5.121309E+02 | -2.664588E-02 | 2.127723E-03 | -2.426652E-04 | 4.119053E-05 |
| 92 | -1.638147E+00 | -1.782131E-02 | 2.721189E-03 | -3.823198E-04 | 3.887795E-05 |
| No. | $a_{12}$ | $a_{14}$ | $a_{16}$ | $a_{18}$ | $a_{20}$ |
| 11 | 7.716255E-04 | -2.346078E-04 | 4.321100E-05 | -4.449186E-06 | 1.963229E-07 |
| 12 | 7.486081E-03 | -2.095962E-03 | 3.505099E-04 | -3.192606E-05 | 1.213766E-06 |
| 21 | 9.459297E-03 | -2.823388E-03 | 5.092765E-04 | -5.076861E-05 | 2.170134E-06 |
| 22 | 9.462889E-03 | -2.821221E-03 | 5.097059E-04 | -5.072688E-05 | 2.187375E-06 |
| 31 | 9.456254E-03 | -2.821577E-03 | 5.101219E-04 | -5.062777E-05 | 2.106963E-06 |
| 32 | 1.461844E-02 | -4.917046E-03 | 1.021422E-03 | -1.204225E-04 | 6.295474E-06 |
| 41 | 7.358315E-03 | -2.680751E-03 | 6.197809E-04 | -8.231124E-05 | 4.785026E-06 |
| 42 | 6.339645E-02 | -2.073738E-02 | 4.300361E-03 | -5.125560E-04 | 2.665596E-05 |
| 51 | 5.970078E-02 | -1.967872E-02 | 4.162784E-03 | -5.123726E-04 | 2.787277E-05 |
| 52 | 2.923181E-03 | -6.573409E-04 | 1.015551E-04 | -1.015898E-05 | 5.013170E-07 |
| 61 | -1.439933E-03 | 3.784471E-04 | -5.390453E-05 | 4.026115E-06 | -1.242598E-07 |
| 62 | -1.209790E-03 | 1.973128E-04 | -1.789771E-05 | 8.331933E-07 | -1.519677E-08 |
| 71 | -5.321300E-04 | 8.974414E-05 | -1.011402E-05 | 6.631904E-07 | -1.865605E-08 |
| 72 | 5.159996E-05 | -8.451607E-06 | 6.993765E-07 | -3.142003E-08 | 6.311130E-10 |
| 81 | 3.296572E-05 | -4.881040E-06 | 4.575284E-07 | -2.405873E-08 | 5.387340E-10 |
| 82 | -1.597269E-05 | 1.210987E-06 | -5.983965E-08 | 1.723550E-09 | -2.173300E-11 |
| 91 | -4.183053E-06 | 2.365075E-07 | -7.573316E-09 | 1.302150E-10 | -9.360000E-13 |
| 92 | -2.663906E-06 | 1.195470E-07 | -3.373999E-09 | 5.422300E-11 | -3.770000E-13 |

FIG. 35

| Seventh Embodiment ||||||
|---|---|---|---|---|---|
| EFL=5.837mm, HFOV=42.240 Degrees, TTL=9.015mm, Fno=1.610, ImgH=6.500mm ||||||
| No. | | Radius of Curvature (mm) | Aperture Stop Distance/ Thickness/ Air Gap (mm) | | Refractive Index | Abbe No. | Focal Length (mm) |
| | Object | Infinity | Infinity | | | | |
| 2 | Ape. Stop | Infinity | -0.338 | | | | |
| 11 | First Lens element | 10.654 | 0.318 | T1 | 1.545 | 55.987 | -3979.417 |
| 12 | | 10.490 | 0.047 | G12 | | | |
| 21 | Second Lens element | 4.810 | 0.535 | T2 | 1.661 | 20.373 | 22.032 |
| 22 | | 6.832 | 0.088 | G23 | | | |
| 31 | Third Lens element | 5.581 | 0.358 | T3 | 1.661 | 20.373 | -31.884 |
| 32 | | 4.307 | 0.185 | G34 | | | |
| 41 | Fourth Lens element | 8.387 | 0.823 | T4 | 1.545 | 55.987 | 8.731 |
| 42 | | -10.674 | 0.023 | G45 | | | |
| 51 | Fifth Lens element | -16.959 | 0.271 | T5 | 1.661 | 20.373 | -21.004 |
| 52 | | 81.163 | 0.241 | G56 | | | |
| 61 | Sixth Lens element | 22.398 | 0.474 | T6 | 1.545 | 55.987 | 51.956 |
| 62 | | 105.447 | 1.099 | G67 | | | |
| 71 | Seventh Lens element | -9.750 | 0.764 | T7 | 1.545 | 55.987 | 7.063 |
| 72 | | -2.841 | 0.038 | G78 | | | |
| 81 | Eighth Lens element | 3.909 | 0.634 | T8 | 1.531 | 49.620 | 3039.734 |
| 82 | | 3.697 | 1.748 | G89 | | | |
| 91 | Ninth Lens element | -47.036 | 0.360 | T9 | 1.531 | 49.620 | -6.716 |
| 92 | | 3.887 | 0.379 | G9F | | | |
| 3 | Filter | Infinity | 0.199 | | 1.563 | 51.300 | |
| | | Infinity | 0.430 | | | | |
| 4 | Image Plane | Infinity | | | | | |

FIG. 36

| No. | K | $a_4$ | $a_6$ | $a_8$ | $a_{10}$ |
|---|---|---|---|---|---|
| 11 | 1.511535E+01 | 1.000056E-02 | -1.756554E-03 | 2.253955E-03 | -1.528142E-03 |
| 12 | 2.560803E+01 | -1.139830E-02 | -4.832121E-03 | 1.888767E-02 | -1.605584E-02 |
| 21 | 1.113197E+00 | -2.428637E-02 | -5.880022E-03 | 2.160447E-02 | -1.922786E-02 |
| 22 | 8.427031E+00 | -1.605739E-02 | -5.959440E-03 | 2.147199E-02 | -1.926168E-02 |
| 31 | 2.240520E+00 | -2.290524E-02 | -5.171535E-03 | 2.134818E-02 | -1.929005E-02 |
| 32 | -3.182357E+00 | -3.697482E-03 | -1.970965E-02 | 3.132760E-02 | -2.733882E-02 |
| 41 | 9.140900E+00 | -3.132142E-05 | -1.206793E-02 | 1.485602E-02 | -1.312529E-02 |
| 42 | -1.417304E-01 | 6.206879E-02 | -1.533056E-01 | 1.708261E-01 | -1.276234E-01 |
| 51 | 6.783484E+01 | 6.131698E-02 | -1.502823E-01 | 1.626737E-01 | -1.204288E-01 |
| 52 | 7.945896E+01 | -5.635124E-04 | -2.252345E-02 | 1.680410E-02 | -8.681855E-03 |
| 61 | -1.060549E+01 | -2.490409E-02 | 6.171488E-04 | -7.502444E-04 | 2.601911E-03 |
| 62 | 7.594403E+01 | -2.642912E-02 | 9.454312E-03 | -7.503609E-03 | 4.134441E-03 |
| 71 | 1.050045E+01 | 1.992630E-03 | 9.172821E-03 | -6.339477E-03 | 2.234437E-03 |
| 72 | -1.038674E+00 | 1.720818E-02 | -1.036186E-03 | -2.438071E-04 | -9.190545E-05 |
| 81 | -4.775515E+00 | 5.009510E-03 | -2.464553E-03 | 5.247432E-04 | -1.451859E-04 |
| 82 | -3.269851E-01 | -1.676096E-02 | 3.344312E-03 | -8.924004E-04 | 1.447506E-04 |
| 91 | 6.942055E+01 | -2.403671E-02 | 2.315481E-03 | -2.465032E-04 | 4.082775E-05 |
| 92 | -4.498078E+00 | -1.790361E-02 | 2.807485E-03 | -3.827947E-04 | 3.886064E-05 |
| No. | $a_{12}$ | $a_{14}$ | $a_{16}$ | $a_{18}$ | $a_{20}$ |
| 11 | 7.764229E-04 | -2.336866E-04 | 4.360874E-05 | -4.349370E-06 | 1.832058E-07 |
| 12 | 7.522801E-03 | -2.092159E-03 | 3.504399E-04 | -3.207156E-05 | 1.247204E-06 |
| 21 | 9.465860E-03 | -2.821185E-03 | 5.096661E-04 | -5.086423E-05 | 2.076229E-06 |
| 22 | 9.462058E-03 | -2.821617E-03 | 5.095484E-04 | -5.087366E-05 | 2.080769E-06 |
| 31 | 9.458445E-03 | -2.822397E-03 | 5.091530E-04 | -5.102431E-05 | 2.044237E-06 |
| 32 | 1.461524E-02 | -4.918478E-03 | 1.020798E-03 | -1.206702E-04 | 6.240686E-06 |
| 41 | 7.352198E-03 | -2.683420E-03 | 6.190923E-04 | -8.232383E-05 | 4.786826E-06 |
| 42 | 6.338479E-02 | -2.073962E-02 | 4.300174E-03 | -5.124496E-04 | 2.672671E-05 |
| 51 | 5.970686E-02 | -1.967693E-02 | 4.163073E-03 | -5.123664E-04 | 2.786284E-05 |
| 52 | 2.924545E-03 | -6.572928E-04 | 1.015369E-04 | -1.017111E-05 | 4.958830E-07 |
| 61 | -1.439782E-03 | 3.784525E-04 | -5.390523E-05 | 4.025282E-06 | -1.244261E-07 |
| 62 | -1.209716E-03 | 1.972892E-04 | -1.790501E-05 | 8.318310E-07 | -1.537626E-08 |
| 71 | -5.315781E-04 | 8.980306E-05 | -1.011008E-05 | 6.631631E-07 | -1.874444E-08 |
| 72 | 5.152274E-05 | -8.461730E-06 | 6.993078E-07 | -3.117582E-08 | 6.956300E-10 |
| 81 | 3.216221E-05 | -4.895182E-06 | 4.612629E-07 | -2.382618E-08 | 5.016770E-10 |
| 82 | -1.596705E-05 | 1.211343E-06 | -5.982866E-08 | 1.722870E-09 | -2.193000E-11 |
| 91 | -4.188347E-06 | 2.370832E-07 | -7.540589E-09 | 1.317120E-10 | -1.094000E-12 |
| 92 | -2.664615E-06 | 1.195709E-07 | -3.372944E-09 | 5.422100E-11 | -3.780000E-13 |

FIG. 37

| | | | Eighth Embodiment | | | |
|---|---|---|---|---|---|---|
| across | | EFL=6.531mm, HFOV=42.147 Degrees, TTL=8.855mm, Fno=1.610, ImgH=6.732mm | | | | |
| No. | | Radius of Curvature (mm) | Aperture Stop Distance/ Thickness/ Air Gap (mm) | | Refractive Index | Abbe No. | Focal Length (mm) |
| | Object | Infinity | Infinity | | | | |
| 2 | Ape. Stop | Infinity | -0.748 | | | | |
| 11 | First Lens element | 3.155 | 1.110 | T1 | 1.545 | 55.987 | 7.550 |
| 12 | | 11.760 | 0.039 | G12 | | | |
| 21 | Second Lens element | 8.719 | 0.297 | T2 | 1.661 | 20.373 | -64.411 |
| 22 | | 7.150 | 0.045 | G23 | | | |
| 31 | Third Lens element | 6.384 | 0.303 | T3 | 1.661 | 20.373 | -40.396 |
| 32 | | 5.063 | 0.616 | G34 | | | |
| 41 | Fourth Lens element | 2092.597 | 0.458 | T4 | 1.545 | 55.987 | 19.551 |
| 42 | | -10.734 | 0.039 | G45 | | | |
| 51 | Fifth Lens element | -190.339 | 0.369 | T5 | 1.661 | 20.373 | -25.382 |
| 52 | | 18.601 | 0.252 | G56 | | | |
| 61 | Sixth Lens element | 25.444 | 0.426 | T6 | 1.545 | 55.987 | 92.903 |
| 62 | | 50.723 | 0.577 | G67 | | | |
| 71 | Seventh Lens element | -10.289 | 0.945 | T7 | 1.545 | 55.987 | 7.067 |
| 72 | | -2.898 | 0.272 | G78 | | | |
| 81 | Eighth Lens element | 5.555 | 0.900 | T8 | 1.661 | 20.373 | -7.773 |
| 82 | | 2.508 | 1.079 | G89 | | | |
| 91 | Ninth Lens element | -146.520 | 0.401 | T9 | 1.545 | 55.987 | 171.462 |
| 92 | | -57.194 | 0.379 | G9F | | | |
| 3 | Filter | Infinity | 0.199 | | 1.563 | 51.300 | |
| | | Infinity | 0.150 | | | | |
| 4 | Image Plane | Infinity | | | | | |

FIG. 38

| No. | K | $a_4$ | $a_6$ | $a_8$ | $a_{10}$ |
|---|---|---|---|---|---|
| 11 | 4.901976E-01 | -1.085848E-03 | -1.591285E-03 | 1.946592E-03 | -1.578694E-03 |
| 12 | 2.599903E+01 | -1.679745E-02 | -5.380079E-03 | 1.883663E-02 | -1.609578E-02 |
| 21 | 5.922335E+00 | -1.873317E-02 | -5.523578E-03 | 2.152197E-02 | -1.925748E-02 |
| 22 | 3.964060E+00 | -2.053860E-02 | -5.421713E-03 | 2.142588E-02 | -1.928026E-02 |
| 31 | 3.460690E+00 | -2.076785E-02 | -5.444935E-03 | 2.148269E-02 | -1.927868E-02 |
| 32 | 1.885297E+00 | 1.630769E-03 | -1.878962E-02 | 3.130689E-02 | -2.734737E-02 |
| 41 | 5.138792E+01 | -3.306402E-03 | -1.123136E-02 | 1.492228E-02 | -1.314491E-02 |
| 42 | -5.265214E+01 | 6.751321E-02 | -1.526773E-01 | 1.709042E-01 | -1.275953E-01 |
| 51 | 3.989959E+01 | 7.044404E-02 | -1.501817E-01 | 1.626875E-01 | -1.204378E-01 |
| 52 | 7.200730E+00 | 1.391302E-03 | -2.239537E-02 | 1.677127E-02 | -8.691559E-03 |
| 61 | 3.661979E+01 | -2.478840E-02 | 5.789721E-04 | -7.420293E-04 | 2.602893E-03 |
| 62 | -2.059277E+01 | -2.534571E-02 | 9.610958E-03 | -7.513484E-03 | 4.132561E-03 |
| 71 | -8.116499E+00 | 2.559715E-04 | 9.091973E-03 | -6.357351E-03 | 2.230904E-03 |
| 72 | -1.868411E+00 | 1.658708E-02 | -1.463876E-03 | -2.747196E-04 | -9.286817E-05 |
| 81 | -2.081647E+01 | -7.735348E-03 | -2.634907E-03 | 4.530188E-04 | -1.382695E-04 |
| 82 | -4.370119E+00 | -1.948918E-02 | 3.639833E-03 | -8.878404E-04 | 1.446612E-04 |
| 91 | 5.166681E+01 | -2.334562E-02 | 2.166109E-03 | -2.429671E-04 | 4.114018E-05 |
| 92 | 4.766103E+01 | -1.556318E-02 | 2.760843E-03 | -3.835303E-04 | 3.886781E-05 |
| No. | $a_{12}$ | $a_{14}$ | $a_{16}$ | $a_{18}$ | $a_{20}$ |
| 11 | 7.715466E-04 | -2.344927E-04 | 4.324670E-05 | -4.445917E-06 | 1.945203E-07 |
| 12 | 7.485056E-03 | -2.096392E-03 | 3.503783E-04 | -3.195417E-05 | 1.207343E-06 |
| 21 | 9.457712E-03 | -2.823633E-03 | 5.091670E-04 | -5.081515E-05 | 2.148155E-06 |
| 22 | 9.459491E-03 | -2.821944E-03 | 5.095309E-04 | -5.081439E-05 | 2.135710E-06 |
| 31 | 9.455198E-03 | -2.822548E-03 | 5.097631E-04 | -5.070372E-05 | 2.112199E-06 |
| 32 | 1.461550E-02 | -4.917753E-03 | 1.021229E-03 | -1.204516E-04 | 6.326693E-06 |
| 41 | 7.348552E-03 | -2.682531E-03 | 6.197407E-04 | -8.217878E-05 | 4.821003E-06 |
| 42 | 6.339446E-02 | -2.073784E-02 | 4.300264E-03 | -5.125320E-04 | 2.668324E-05 |
| 51 | 5.970129E-02 | -1.967854E-02 | 4.162772E-03 | -5.123918E-04 | 2.786329E-05 |
| 52 | 2.922958E-03 | -6.574310E-04 | 1.015442E-04 | -1.015753E-05 | 5.029660E-07 |
| 61 | -1.439857E-03 | 3.784505E-04 | -5.390496E-05 | 4.026081E-06 | -1.242327E-07 |
| 62 | -1.209827E-03 | 1.973117E-04 | -1.789736E-05 | 8.333426E-07 | -1.516333E-08 |
| 71 | -5.321033E-04 | 8.975146E-05 | -1.011291E-05 | 6.633453E-07 | -1.863642E-08 |
| 72 | 5.162220E-05 | -8.446892E-06 | 6.997415E-07 | -3.137333E-08 | 6.322170E-10 |
| 81 | 3.313456E-05 | -4.897421E-06 | 4.551170E-07 | -2.431252E-08 | 5.250290E-10 |
| 82 | -1.597793E-05 | 1.210791E-06 | -5.986052E-08 | 1.721830E-09 | -2.183300E-11 |
| 91 | -4.185492E-06 | 2.364237E-07 | -7.575882E-09 | 1.301600E-10 | -9.370000E-13 |
| 92 | -2.664453E-06 | 1.195779E-07 | -3.372473E-09 | 5.423700E-11 | -3.790000E-13 |

FIG. 39

| No. | | Radius of Curvature (mm) | Aperture Stop Distance/ Thickness/ Air Gap (mm) | | Refractive Index | Abbe No. | Focal Length (mm) |
|---|---|---|---|---|---|---|---|
| | Ninth Embodiment |
| | EFL=6.098mm, HFOV=44.136 Degrees, TTL=8.288mm, Fno=1.390, ImgH=6.901mm |
| | Object | Infinity | Infinity | | | | |
| 2 | Ape. Stop | Infinity | -0.927 | | | | |
| 11 | First Lens element | 3.159 | 1.157 | T1 | 1.545 | 55.987 | 7.525 |
| 12 | | 11.872 | 0.032 | G12 | | | |
| 21 | Second Lens element | 9.170 | 0.287 | T2 | 1.661 | 20.373 | -62.810 |
| 22 | | 7.429 | 0.035 | G23 | | | |
| 31 | Third Lens element | 6.699 | 0.291 | T3 | 1.661 | 20.373 | -43.373 |
| 32 | | 5.345 | 0.480 | G34 | | | |
| 41 | Fourth Lens element | 87.092 | 0.650 | T4 | 1.545 | 55.987 | 15.389 |
| 42 | | -9.280 | 0.037 | G45 | | | |
| 51 | Fifth Lens element | -22.389 | 0.389 | T5 | 1.661 | 20.373 | -26.772 |
| 52 | | 88.915 | 0.200 | G56 | | | |
| 61 | Sixth Lens element | 38.661 | 0.440 | T6 | 1.545 | 55.987 | 163.439 |
| 62 | | 67.914 | 0.640 | G67 | | | |
| 71 | Seventh Lens element | -13.275 | 0.755 | T7 | 1.545 | 55.987 | 6.658 |
| 72 | | -2.912 | 0.033 | G78 | | | |
| 81 | Eighth Lens element | 8.344 | 0.595 | T8 | 1.661 | 20.373 | -28.666 |
| 82 | | 5.644 | 1.220 | G89 | | | |
| 91 | Ninth Lens element | -6.405 | 0.268 | T9 | 1.545 | 55.987 | -5.659 |
| 92 | | 6.065 | 0.379 | G9F | | | |
| 3 | Filter | Infinity | 0.199 | | 1.563 | 51.300 | |
| | | Infinity | 0.203 | | | | |
| 4 | Image Plane | Infinity | | | | | |

FIG. 40

| No. | K | $a_4$ | $a_6$ | $a_8$ | $a_{10}$ |
|---|---|---|---|---|---|
| 11 | 5.122659E-01 | -8.424263E-04 | -1.545439E-03 | 1.960105E-03 | -1.577292E-03 |
| 12 | 2.648590E+01 | -1.644794E-02 | -5.336002E-03 | 1.883312E-02 | -1.609682E-02 |
| 21 | 5.259290E+00 | -1.898300E-02 | -5.556694E-03 | 2.152186E-02 | -1.925818E-02 |
| 22 | 4.075501E+00 | -2.051291E-02 | -5.420351E-03 | 2.141961E-02 | -1.928149E-02 |
| 31 | 3.178851E+00 | -2.101711E-02 | -5.484866E-03 | 2.148451E-02 | -1.927727E-02 |
| 32 | 1.639313E+00 | 1.126768E-03 | -1.891090E-02 | 3.130586E-02 | -2.734538E-02 |
| 41 | 7.226933E+01 | -2.830091E-03 | -1.146221E-02 | 1.489462E-02 | -1.315334E-02 |
| 42 | -3.088334E+01 | 6.589984E-02 | -1.528797E-01 | 1.708738E-01 | -1.275984E-01 |
| 51 | 2.399817E+01 | 6.950213E-02 | -1.502784E-01 | 1.626971E-01 | -1.204386E-01 |
| 52 | 7.400170E+01 | 1.436434E-03 | -2.236852E-02 | 1.675699E-02 | -8.692232E-03 |
| 61 | 3.199564E+01 | -2.493608E-02 | 5.546352E-04 | -7.466256E-04 | 2.602542E-03 |
| 62 | -6.010454E+01 | -2.545333E-02 | 9.569677E-03 | -7.513769E-03 | 4.132528E-03 |
| 71 | 1.429429E+00 | -6.988523E-04 | 9.237454E-03 | -6.350014E-03 | 2.230803E-03 |
| 72 | -2.287224E+00 | 1.770123E-02 | -1.396674E-03 | -2.719241E-04 | -9.276227E-05 |
| 81 | -2.422550E+00 | -4.074549E-03 | -1.850076E-03 | 4.308154E-04 | -1.443348E-04 |
| 82 | -2.756954E-01 | -1.856884E-02 | 3.482257E-03 | -8.883738E-04 | 1.447235E-04 |
| 91 | -1.210567E+01 | -2.233529E-02 | 2.167573E-03 | -2.431010E-04 | 4.113954E-05 |
| 92 | -4.404980E+00 | -1.726891E-02 | 2.747904E-03 | -3.837105E-04 | 3.886481E-05 |
| No. | $a_{12}$ | $a_{14}$ | $a_{16}$ | $a_{18}$ | $a_{20}$ |
| 11 | 7.716206E-04 | -2.344933E-04 | 4.325037E-05 | -4.444212E-06 | 1.951348E-07 |
| 12 | 7.484827E-03 | -2.096414E-03 | 3.503762E-04 | -3.195173E-05 | 1.209523E-06 |
| 21 | 9.457306E-03 | -2.823755E-03 | 5.091456E-04 | -5.081553E-05 | 2.149632E-06 |
| 22 | 9.459342E-03 | -2.821916E-03 | 5.095351E-04 | -5.082052E-05 | 2.130228E-06 |
| 31 | 9.455453E-03 | -2.822571E-03 | 5.097360E-04 | -5.071892E-05 | 2.108666E-06 |
| 32 | 1.461574E-02 | -4.918047E-03 | 1.021069E-03 | -1.204824E-04 | 6.330832E-06 |
| 41 | 7.346448E-03 | -2.682958E-03 | 6.197013E-04 | -8.216913E-05 | 4.824054E-06 |
| 42 | 6.339411E-02 | -2.073763E-02 | 4.300343E-03 | -5.125124E-04 | 2.668977E-05 |
| 51 | 5.970066E-02 | -1.967862E-02 | 4.162804E-03 | -5.123755E-04 | 2.787002E-05 |
| 52 | 2.923169E-03 | -6.574371E-04 | 1.015413E-04 | -1.015889E-05 | 5.021976E-07 |
| 61 | -1.439860E-03 | 3.784546E-04 | -5.390446E-05 | 4.025918E-06 | -1.243244E-07 |
| 62 | -1.209839E-03 | 1.973059E-04 | -1.789859E-05 | 8.330826E-07 | -1.521081E-08 |
| 71 | -5.321744E-04 | 8.973892E-05 | -1.011445E-05 | 6.631823E-07 | -1.865116E-08 |
| 72 | 5.162410E-05 | -8.447187E-06 | 6.996201E-07 | -3.139623E-08 | 6.291740E-10 |
| 81 | 3.293003E-05 | -4.882050E-06 | 4.573324E-07 | -2.409370E-08 | 5.341510E-10 |
| 82 | -1.597384E-05 | 1.210863E-06 | -5.984696E-08 | 1.723019E-09 | -2.177300E-11 |
| 91 | -4.185369E-06 | 2.364316E-07 | -7.575571E-09 | 1.301690E-10 | -9.370000E-13 |
| 92 | -2.664327E-06 | 1.195847E-07 | -3.372202E-09 | 5.424400E-11 | -3.790000E-13 |

FIG. 41

| Embodiment | 1st | 2nd | 3rd | 4th | 5th | 6th | 7th | 8th | 9th |
|---|---|---|---|---|---|---|---|---|---|
| EFL | 6.883 | 7.036 | 6.071 | 7.003 | 6.490 | 5.918 | 5.837 | 6.531 | 6.098 |
| Fno | 1.610 | 1.610 | 1.610 | 1.610 | 1.610 | 1.610 | 1.610 | 1.610 | 1.390 |
| HFOV | 42.147 | 43.016 | 42.147 | 42.155 | 41.940 | 41.907 | 42.240 | 42.147 | 44.136 |
| ImgH | 6.940 | 6.977 | 6.755 | 6.667 | 6.500 | 6.500 | 6.500 | 6.732 | 6.901 |
| T1 | 1.013 | 1.123 | 1.044 | 1.123 | 0.829 | 1.015 | 0.318 | 1.110 | 1.157 |
| G12 | 0.036 | 0.040 | 0.050 | 0.034 | 0.023 | 0.033 | 0.047 | 0.039 | 0.032 |
| T2 | 0.254 | 0.258 | 0.295 | 0.291 | 0.291 | 0.299 | 0.535 | 0.297 | 0.287 |
| G23 | 0.034 | 0.038 | 0.029 | 0.053 | 0.053 | 0.041 | 0.088 | 0.045 | 0.035 |
| T3 | 0.254 | 0.257 | 0.255 | 0.257 | 0.292 | 0.299 | 0.358 | 0.303 | 0.291 |
| G34 | 0.478 | 0.505 | 0.556 | 0.655 | 0.574 | 0.417 | 0.185 | 0.616 | 0.480 |
| T4 | 0.649 | 0.610 | 0.678 | 0.323 | 0.481 | 0.628 | 0.823 | 0.458 | 0.650 |
| G45 | 0.033 | 0.036 | 0.043 | 0.038 | 0.049 | 0.037 | 0.023 | 0.039 | 0.037 |
| T5 | 0.266 | 0.261 | 0.412 | 0.547 | 0.359 | 0.418 | 0.271 | 0.369 | 0.389 |
| G56 | 0.210 | 0.317 | 0.140 | 0.183 | 0.297 | 0.246 | 0.241 | 0.252 | 0.200 |
| T6 | 0.248 | 0.242 | 0.495 | 0.485 | 0.439 | 0.447 | 0.474 | 0.426 | 0.440 |
| G67 | 0.643 | 0.548 | 0.536 | 0.662 | 0.676 | 0.531 | 1.099 | 0.577 | 0.640 |
| T7 | 1.055 | 0.946 | 0.810 | 0.684 | 0.704 | 0.761 | 0.764 | 0.945 | 0.755 |
| G78 | 0.119 | 0.036 | 0.039 | 0.127 | 0.050 | 0.444 | 0.038 | 0.272 | 0.033 |
| T8 | 1.081 | 0.870 | 0.551 | 0.543 | 0.773 | 0.769 | 0.634 | 0.900 | 0.595 |
| G89 | 1.062 | 1.163 | 1.120 | 1.273 | 1.549 | 1.177 | 1.748 | 1.079 | 1.220 |
| T9 | 0.659 | 0.901 | 0.476 | 0.676 | 0.506 | 0.421 | 0.360 | 0.401 | 0.268 |
| G9F | 0.379 | 0.379 | 0.379 | 0.379 | 0.379 | 0.250 | 0.379 | 0.379 | 0.379 |
| TF | 0.199 | 0.199 | 0.199 | 0.199 | 0.199 | 0.199 | 0.199 | 0.199 | 0.199 |
| GFP | 0.076 | 0.079 | 0.112 | 0.366 | 0.193 | 0.116 | 0.430 | 0.150 | 0.203 |
| $\upsilon 1$ | 55.987 | 55.987 | 55.987 | 55.987 | 55.987 | 55.987 | 55.987 | 55.987 | 55.987 |
| $\upsilon 2$ | 20.373 | 20.373 | 20.373 | 20.373 | 20.373 | 20.373 | 20.373 | 20.373 | 20.373 |
| $\upsilon 3$ | 20.373 | 20.373 | 20.373 | 20.373 | 20.373 | 20.373 | 20.373 | 20.373 | 20.373 |
| $\upsilon 4$ | 55.987 | 55.987 | 55.987 | 55.987 | 55.987 | 55.987 | 55.987 | 55.987 | 55.987 |
| $\upsilon 5$ | 20.373 | 20.373 | 20.373 | 37.533 | 20.373 | 20.373 | 20.373 | 20.373 | 20.373 |
| $\upsilon 6$ | 55.987 | 55.987 | 55.987 | 55.987 | 55.987 | 55.987 | 55.987 | 55.987 | 55.987 |
| $\upsilon 7$ | 55.987 | 55.987 | 55.987 | 55.987 | 55.987 | 55.987 | 55.987 | 55.987 | 55.987 |
| $\upsilon 8$ | 20.373 | 20.373 | 20.373 | 20.373 | 22.409 | 22.409 | 49.620 | 20.373 | 20.373 |
| $\upsilon 9$ | 55.987 | 55.987 | 55.987 | 55.987 | 22.409 | 55.987 | 49.620 | 55.987 | 55.987 |

FIG. 42

| Embodiment | 1st | 2nd | 3rd | 4th | 5th | 6th | 7th | 8th | 9th |
|---|---|---|---|---|---|---|---|---|---|
| AAG | 2.614 | 2.684 | 2.513 | 3.024 | 3.272 | 2.927 | 3.469 | 2.919 | 2.676 |
| ALT | 5.477 | 5.469 | 5.016 | 4.931 | 4.675 | 5.057 | 4.539 | 5.208 | 4.831 |
| BFL | 0.653 | 0.656 | 0.690 | 0.944 | 0.771 | 0.564 | 1.008 | 0.728 | 0.781 |
| TL | 8.091 | 8.153 | 7.529 | 7.955 | 7.947 | 7.984 | 8.007 | 8.128 | 7.507 |
| TTL | 8.745 | 8.809 | 8.220 | 8.899 | 8.718 | 8.549 | 9.015 | 8.855 | 8.288 |
| EPD | 4.275 | 4.370 | 3.771 | 4.350 | 4.031 | 3.675 | 3.626 | 4.057 | 4.387 |
| $\upsilon5+\upsilon9$ | 76.360 | 76.360 | 76.360 | 93.520 | 42.782 | 42.782 | 69.993 | 76.360 | 76.360 |
| $\upsilon8+\upsilon9$ | 76.360 | 76.360 | 76.360 | 76.360 | 44.818 | 44.818 | 99.240 | 76.360 | 76.360 |
| $\upsilon5+\upsilon6$ | 76.360 | 76.360 | 76.360 | 93.520 | 76.360 | 76.360 | 76.360 | 76.360 | 76.360 |
| Fno*AA15/T2 | 5.016 | 5.842 | 4.469 | 5.321 | 5.512 | 4.172 | 1.757 | 5.381 | 3.798 |
| (EPD+TTL)/D12t62 | 5.291 | 5.138 | 4.059 | 4.622 | 4.460 | 4.266 | 4.150 | 4.540 | 4.465 |
| (T1+D62t92)/(AA15+T6) | 5.421 | 4.741 | 3.483 | 3.514 | 3.543 | 4.191 | 4.688 | 3.727 | 3.816 |
| (AAG+BFL)/D62t82 | 2.840 | 2.957 | 2.870 | 3.492 | 3.622 | 3.152 | 3.866 | 3.190 | 3.062 |
| HFOV/Fno | 26.178 | 26.718 | 26.178 | 26.184 | 26.049 | 26.029 | 26.236 | 26.178 | 31.753 |
| (D12t32+D51t62)/D32t51 | 1.123 | 1.226 | 1.313 | 1.822 | 1.589 | 1.647 | 1.955 | 1.556 | 1.435 |
| D41t62/(T3+G34) | 1.923 | 1.922 | 2.179 | 1.728 | 1.877 | 2.478 | 3.373 | 1.681 | 2.226 |
| Fno*D11t32/T7 | 2.427 | 2.921 | 3.328 | 4.136 | 3.404 | 3.568 | 2.840 | 3.056 | 3.313 |
| D11t32/G67 | 2.472 | 3.130 | 3.123 | 2.655 | 2.201 | 3.175 | 1.226 | 3.108 | 2.812 |
| (ALT+EPD)/D11t32 | 6.133 | 5.733 | 5.251 | 5.279 | 5.849 | 5.177 | 6.060 | 5.166 | 5.119 |
| Fno*D11t62/(T7+T8+T9) | 2.001 | 2.186 | 3.505 | 3.373 | 2.993 | 3.201 | 3.080 | 2.835 | 3.431 |
| D41t62/G67 | 2.186 | 2.674 | 3.301 | 2.380 | 2.403 | 3.342 | 1.667 | 2.676 | 2.678 |
| (D12t32+D51t62)/T8 | 1.204 | 1.623 | 3.045 | 3.406 | 2.268 | 2.318 | 3.177 | 1.925 | 2.811 |
| (AA15+T6)/G67 | 1.615 | 2.149 | 2.452 | 2.187 | 2.123 | 2.299 | 0.963 | 2.456 | 1.910 |
| HFOV/D12t62 | 17.126 | 16.771 | 14.268 | 14.706 | 14.671 | 14.626 | 13.868 | 14.819 | 15.548 |
| (EPD+TL)/(D12t32+D51t62) | 9.501 | 8.864 | 6.738 | 6.649 | 6.827 | 6.539 | 5.773 | 7.038 | 7.111 |
| (ImgH+EPD)/(D12t32+D41t62) | 5.655 | 5.510 | 4.390 | 4.982 | 4.610 | 4.156 | 3.539 | 4.842 | 4.785 |
| (EFL+EPD)/(D12t32+D41t62) | 5.626 | 5.538 | 4.104 | 5.134 | 4.606 | 3.918 | 3.308 | 4.752 | 4.445 |

FIG. 43

OPTICAL IMAGING LENS

BACKGROUND OF THE INVENTION

1. Field of the Invention

The present invention generally relates to an optical imaging lens. Specifically speaking, the present invention is directed to an optical imaging lens for using in electronic devices, such as for application in portable electronic devices, for example a mobile phone, a head-mounted display device (AR, VR, MR), a tablet personal computer, or a personal digital assistant (PDA) and for taking pictures or for recording videos.

2. Description of the Prior Art

The specifications of portable electronic devices are changing, and their key components-optical imaging lenses are also developing more diversely. As far as a main lens of a portable electronic device is concerned, it does not only pursues a smaller f-number (Fno) and maintain a shorter system length, but also pursues more pixels and better resolution. More pixels imply the increase of the image height of the lens to receive more imaging rays to meet the pixel demands by using a larger imaging sensor.

However, the design of a larger aperture stop makes the lens receive more imaging rays but more difficult to design. More pixels make the resolution of the lens higher to go with the design of a larger aperture stop to make it much more difficult to design. Therefore, it is a problem to add more lens elements in the limited system length and to increase the resolution while to have a larger aperture stop and a larger image height to be solved.

SUMMARY OF THE INVENTION

In the light of above, various embodiments of the present invention propose an optical imaging lens of nine lens elements which has a larger aperture stop, a larger image height, enhanced resolution, maintains good imaging quality, and is technically possible. The optical imaging lens of nine lens elements of the present invention from an object side to an image side in order along an optical axis has a first lens element, a second lens element, a third lens element, a fourth lens element, a fifth lens element, a sixth lens element, a seventh lens element, an eighth lens element and a ninth lens element. Each one of the first lens element, the second lens element, the third lens element, the fourth lens element, the fifth lens element, the sixth lens element, the seventh lens element, the eighth lens element and the ninth lens element respectively has an object-side surface which faces toward the object side to allow imaging rays to pass through as well as an image-side surface which faces toward the image side to allow the imaging rays to pass through.

In one embodiment, a periphery region of the object-side surface of the fourth lens element is concave and an optical axis region of the image-side surface of the fourth lens element is convex, an optical axis region of the object-side surface of the seventh lens element is concave, an optical axis region of the image-side surface of the eighth lens element is concave, and an optical axis region of the object-side surface of the ninth lens element is concave. Lens elements included by the optical imaging lens are only the nine lens elements described above to satisfy $v5+v9 \leq 100.000$.

In another embodiment of the present invention, the first lens element has positive refracting power, the second lens element has negative refracting power, a periphery region of the object-side surface of the third lens element is convex, a periphery region of the object-side surface of the fourth lens element is concave, an optical axis region of the object-side surface of the seventh lens element is concave, and an optical axis region of the image-side surface of the ninth lens element is concave. Lens elements included by the optical imaging lens are only the nine lens elements described above to satisfy $v8+v9 \leq 100.000$.

In still another embodiment of the present invention, a periphery region of the image-side surface of the third lens element is concave, a periphery region of the object-side surface of the fifth lens element is concave, an optical axis region of the object-side surface of the sixth lens element is convex, an optical axis region of the object-side surface of the seventh lens element is concave, and an optical axis region of the image-side surface of the ninth lens element is concave and a periphery region of the image-side surface of the ninth lens element is convex. Lens elements included by the optical imaging lens are only the nine lens elements described above to satisfy $v8+v9 \leq 100.000$.

In the optical imaging lens of the present invention, the embodiments may also selectively satisfy the following optical relationships:

$v5+v6 \leq 100.000$;

$v3+v9 \leq 100.000$;

$v7+v8+v9 \leq 135.000$;

$Fno*AA15/T2 \leq 6.000$;

$4.000 \leq (EPD+TTL)/D12t62$;

$3.200 \leq (T1+D62t92)/(AA15+T6)$;

$(AAG+BFL)/D62t82 \leq 3.900$;

$26.000 \text{ degrees} \leq HFOV/Fno$;

$(D12t32+D51t62)/D32t51 \leq 2.100$;

$D41t62/(T3+G34) \leq 3.400$;

$Fno*D11t32/T7 \leq 4.300$;

$D11t32/G67 \leq 3.400$;

$5.000 \leq (ALT+EPD)/D11t32$;

$Fno*D11t62/(T7+T8+T9) \leq 3.600$;

$D41t62/G67 \leq 3.600$;

$(D12t32+D51t62)/T8 \leq 3.500$;

$(AA15+T6)/G67 \leq 2.500$;

$13.000 \text{ degrees/mm} \leq HFOV/D12t62$;

$5.700 \leq (EPD+TL)/(D12t32+D51t62)$;

$2.700 \leq (ImgH+EPD)/(D12t32+D41t62)$;

$2.700 \leq (EFL+EPD)/(D12t32+D41t62)$.

In the present invention, T1 is a thickness of the first lens element along the optical axis, T2 is a thickness of the second lens element along the optical axis, T3 is a thickness of the third lens element along the optical axis, T6 is a thickness of the sixth lens element along the optical axis, T7 is a thickness of the seventh lens element along the optical axis, T8 is a thickness of the eighth lens element along the optical axis, and T9 is a thickness of the ninth lens element along the optical axis.

Further, G34 is an air gap between the third lens element and the fourth lens element along the optical axis, G67 is an air gap between the sixth lens element and the seventh lens element along the optical axis. v3 is an Abbe number of the third lens element, v5 is an Abbe number of the fifth lens element, v6 is an Abbe number of the sixth lens element, v7 is an Abbe number of the seventh lens element, v8 is an Abbe number of the eighth lens element, v9 is an Abbe number of the ninth lens element.

AA15 is a sum of five air gaps from the first lens element to the sixth lens element along the optical axis, D12t62 is defined as a distance from the image-side surface of the first lens element to the image-side surface of the sixth lens element along the optical axis, D62t92 is defined as a distance from the image-side surface of the sixth lens element to the image-side surface of the ninth lens element along the optical axis, D62t82 is defined as a distance from the image-side surface of the sixth lens element to the image-side surface of the eighth lens element along the optical axis, D12t32 is defined as a distance from the image-side surface of the first lens element to the image-side surface of the third lens element along the optical axis, D51t62 is defined as a distance from the object-side surface of the fifth lens element to the image-side surface of the sixth lens element along the optical axis, D32t51 is defined as a distance from the image-side surface of the third lens element to the object-side surface of the fifth lens element along the optical axis, D41t62 is defined as a distance from the object-side surface of the fourth lens element to the image-side surface of the sixth lens element along the optical axis, D11t32 is defined as a distance from the object-side surface of the first lens element to the image-side surface of the third lens element along the optical axis.

TTL is a distance from the object-side surface of the first lens element to an image plane along the optical axis, ALT is a sum of nine thicknesses of the nine lens elements from the first lens element to the ninth lens element along the optical axis, TL is a distance from the object-side surface of the first lens element to the image-side surface of the ninth lens element along the optical axis, AAG is a sum of eight air gaps from the first lens element to the ninth lens element along the optical axis, EPD is an entrance pupil diameter of the optical imaging lens, Fno is an f-number of the optical imaging lens, HFOV stands for the half field of view of the optical imaging lens, ImgH is an image height of the optical imaging lens, BFL is a distance from the image-side surface of the ninth lens element to the image plane along the optical axis, and EFL is an effective focal length of the optical imaging lens.

These and other objectives of the present invention will no doubt become obvious to those of ordinary skill in art after reading the following detailed description of the preferred embodiment that is illustrated in the various figures and drawings.

BRIEF DESCRIPTION OF THE DRAWINGS

FIG. 16 illustrates a sixth embodiment of the optical imaging lens of the present invention.

FIG. 17A illustrates the longitudinal spherical aberration on the image plane of the sixth embodiment.

FIG. 17B illustrates the field curvature aberration on the sagittal direction of the sixth embodiment.

FIG. 17C illustrates the field curvature aberration on the tangential direction of the sixth embodiment.

FIG. 17D illustrates the distortion of the sixth embodiment.

FIG. 24 shows the optical data of the first embodiment of the optical imaging lens.

FIG. 25 shows aspheric surface data of the first embodiment.

FIG. 26 shows the optical data of the second embodiment of the optical imaging lens.

FIG. 27 shows aspheric surface data of the second embodiment.

FIG. 28 shows the optical data of the third embodiment of the optical imaging lens.

FIG. 29 shows aspheric surface data of the third embodiment.

FIG. 30 shows the optical data of the fourth embodiment of the optical imaging lens.

FIG. 31 shows aspheric surface data of the fourth embodiment.

FIG. 32 shows the optical data of the fifth embodiment of the optical imaging lens.

FIG. 33 shows aspheric surface data of the fifth embodiment.

FIG. 34 shows the optical data of the sixth embodiment of the optical imaging lens.

FIG. 35 shows aspheric surface data of the sixth embodiment.

FIG. 36 shows the optical data of the seventh embodiment of the optical imaging lens.

FIG. 37 shows aspheric surface data of the seventh embodiment.

FIG. 38 shows the optical data of the eighth embodiment of the optical imaging lens.

FIG. 39 shows aspheric surface data of the eighth embodiment.

FIG. 40 shows the optical data of the ninth embodiment of the optical imaging lens.

FIG. 41 shows aspheric surface data of the ninth embodiment.

FIG. 42 shows some important parameters in each embodiment.

FIG. 43 shows some important ratios in each embodiment.

DETAILED DESCRIPTION

The terms "optical axis region", "periphery region", "concave", and "convex" used in this specification and claims should be interpreted based on the definition listed in the specification by the principle of lexicographer.

Figure 1:
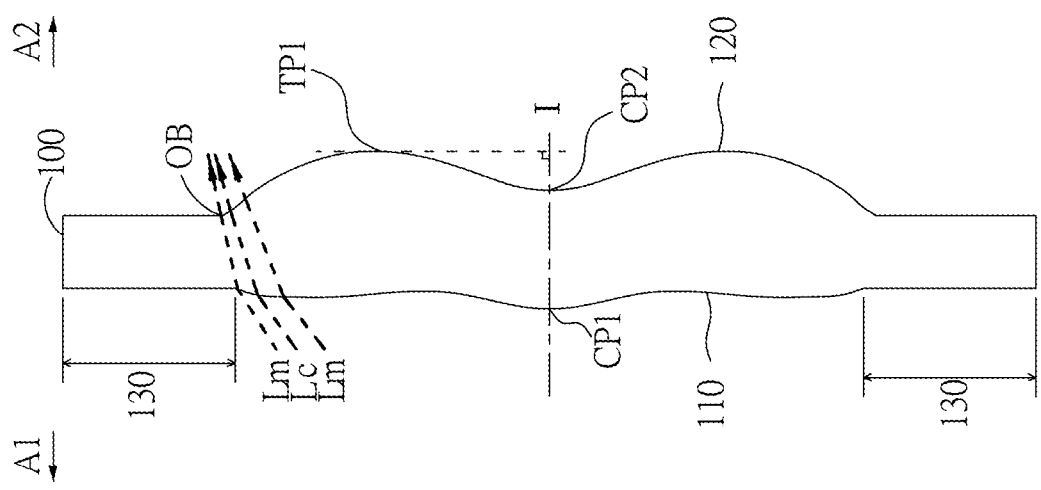

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
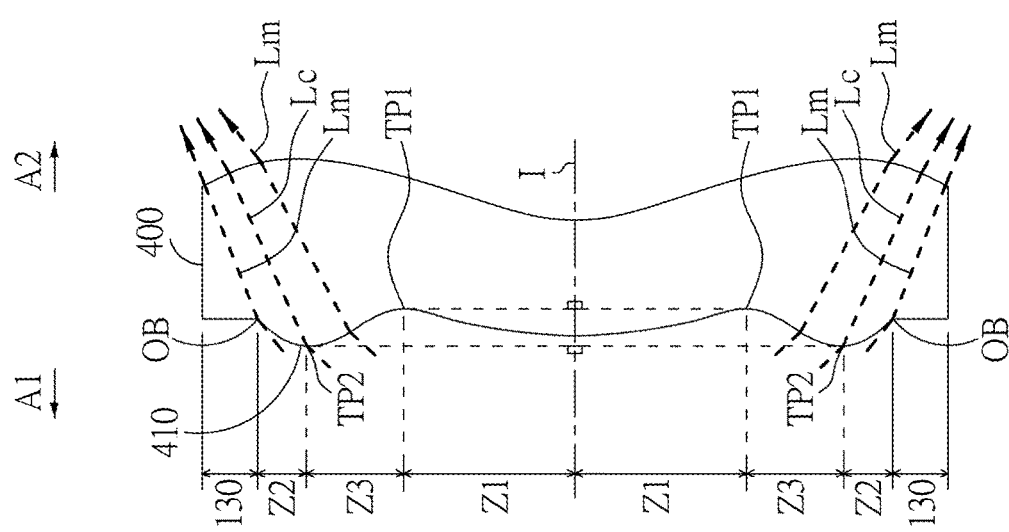

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
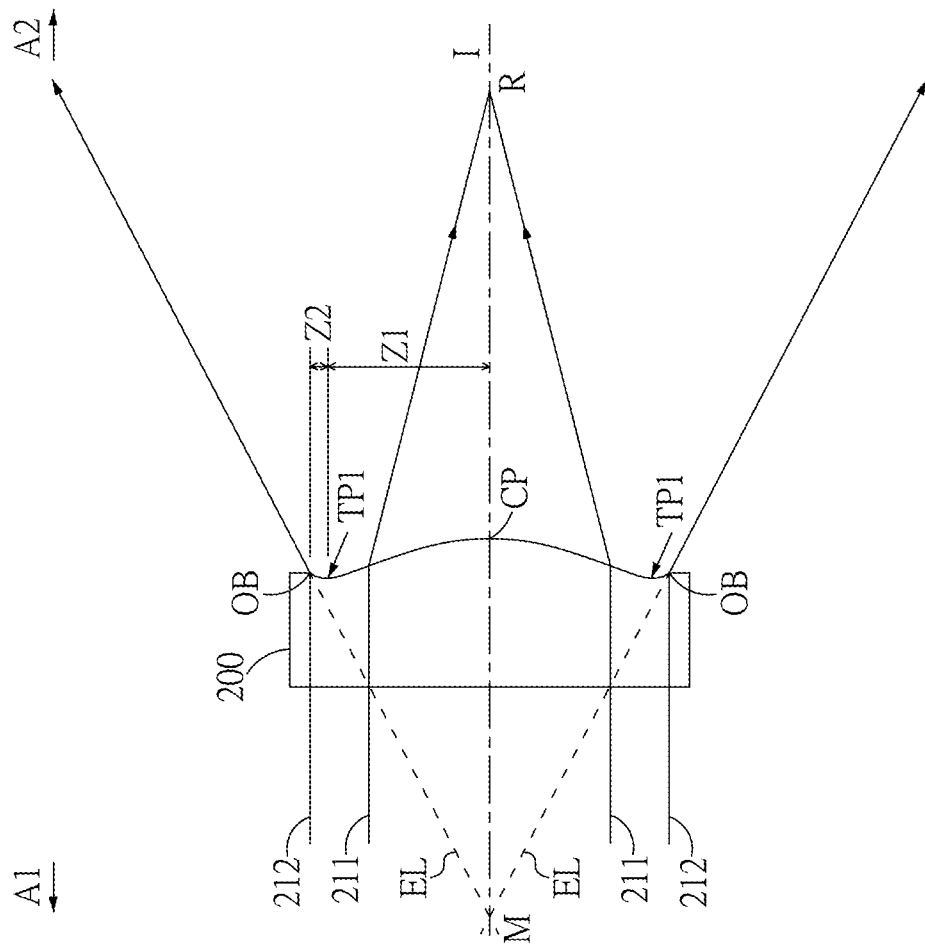
FIGS. 1-5 illustrate the methods for determining the surface shapes and for determining optical axis region or periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
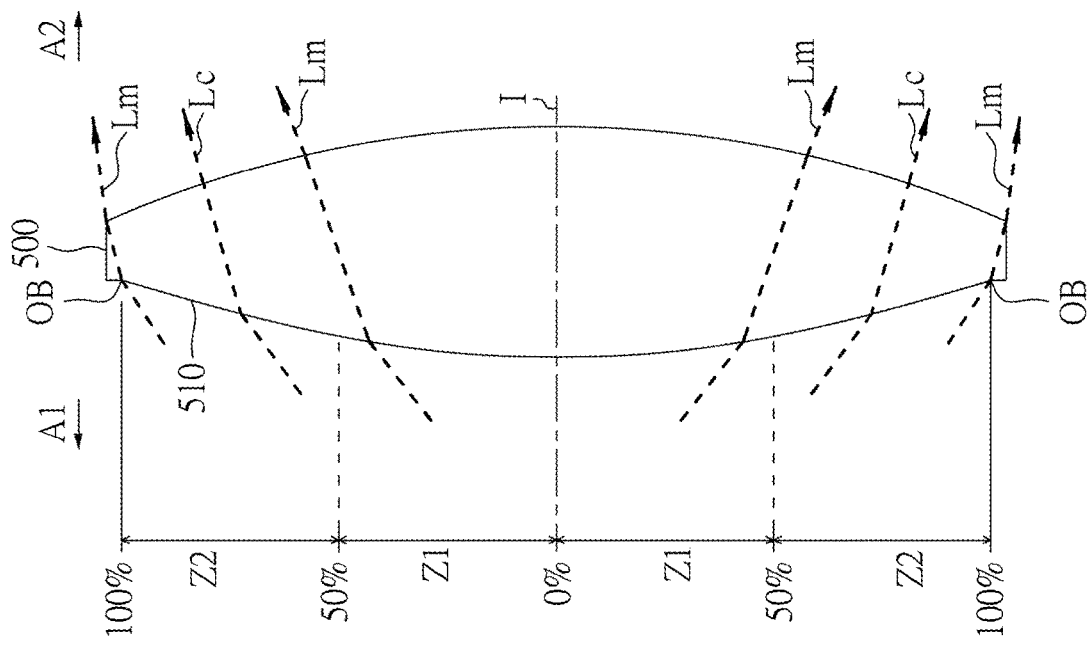
Figure 3:
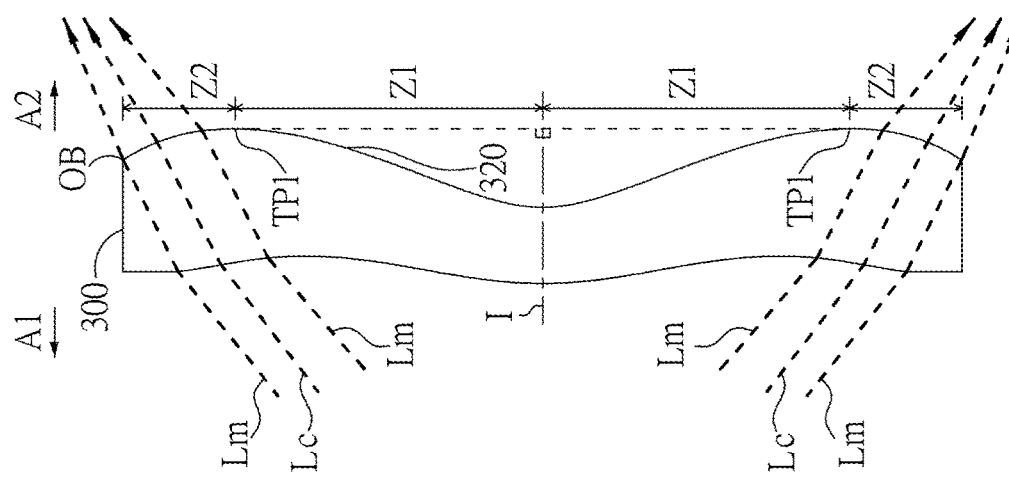

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
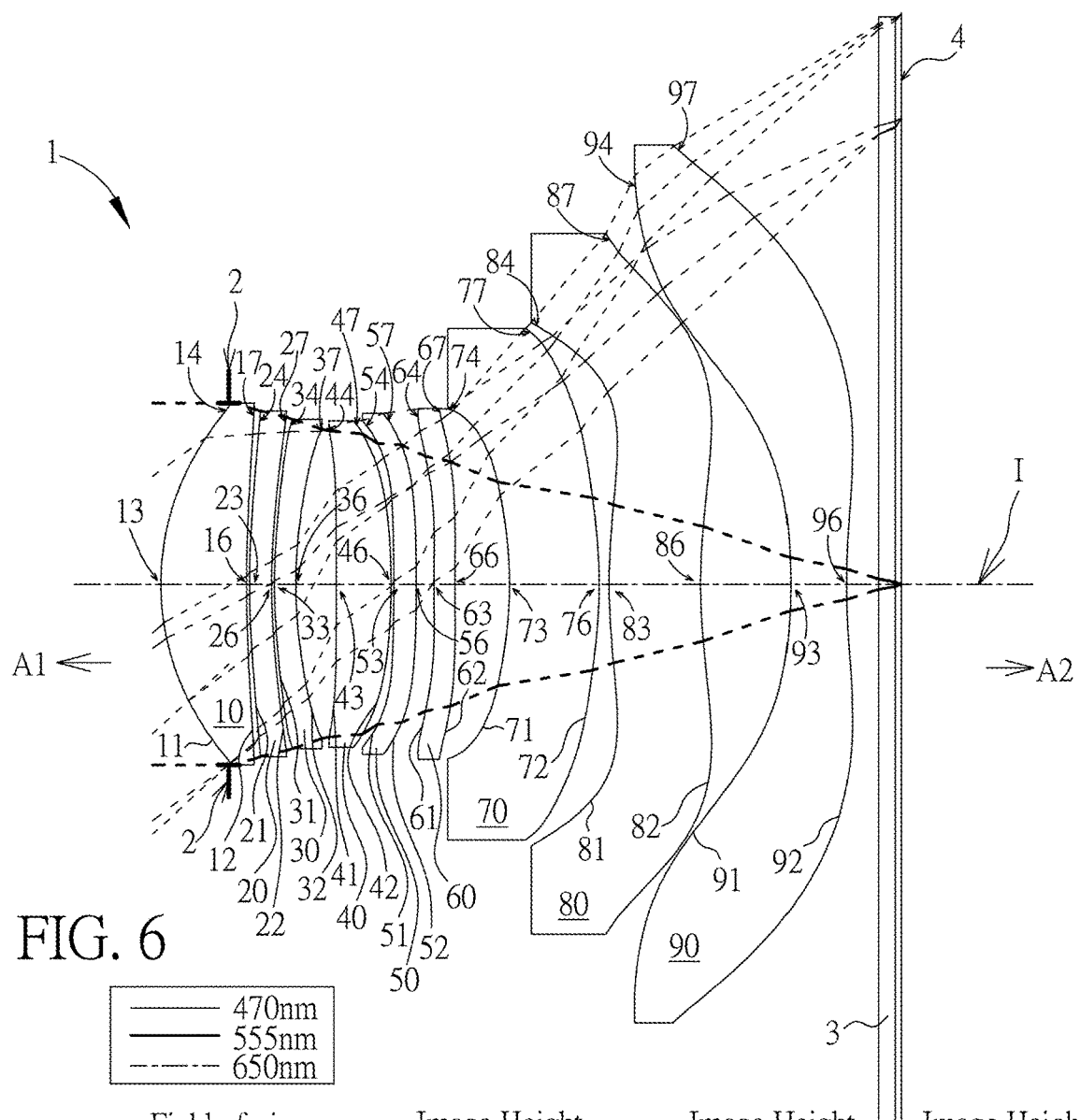
FIG. 6 illustrates a first embodiment of the optical imaging lens of the present invention.

As shown in FIG. 6, the optical imaging lens 1 of nine lens elements of the present invention, sequentially located from an object side A1 (where an object is located) to an image side A2 along an optical axis I, has a first lens element 10, a second lens element 20, a third lens element 30, a fourth lens element 40, a fifth lens element 50, a sixth lens element 60, a seventh lens element 70, an eighth lens element 80, a ninth lens element 90 and an image plane 4. Generally speaking, the first lens element 10, the second lens element 20, the third lens element 30, the fourth lens element 40, the fifth lens element 50, the sixth lens element 60, the seventh lens element 70, the eighth lens element 80 and the ninth lens element 90 may be made of a transparent plastic material but the present invention is not limited to this, and each has appropriate refracting power. In the present invention, lens elements having refracting power included by the optical imaging lens 1 are only the nine lens elements, for example the first lens element 10, the second lens element 20, the third lens element 30, the fourth lens element 40, the fifth lens element 50, the sixth lens element 60, the seventh lens element 70, the eighth lens element 80 and the ninth lens element 90 described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 2 disposed in an appropriate position. In FIG. 6, aperture stop 2 is disposed at the object side A1 of the first lens element 10. In other words, the first lens element 10 is disposed between aperture stop 2 and the second lens element 20. When ray emitted or reflected by an object (not shown) which is located at the object side A1 enters the optical imaging lens 1 of the present invention, it forms a clear and sharp image on the image plane 4 at the image side A2 after passing through aperture stop 2, the first lens element 10, the second lens element 20, the third lens element 30, the fourth lens element 40, the fifth lens element 50, the sixth lens element 60, the seventh lens element 70, the eighth lens element 80, the ninth lens element 90 and the filter 3. In each embodiment of the present invention, an filter 3 is placed between the ninth lens element 90 and the image plane 4 to filter out ray of a specific wavelength, for some embodiments, the optional filter 3 may be a filter of various suitable functions, for example, the filter 3 may be an infrared cut filter (IR cut filter) to keep infrared ray in the imaging rays from reaching the image plane 4 to jeopardize the imaging quality.

Each lens element in the optical imaging lens 1 of the present invention has an object-side surface facing toward the object side A1 as well as an image-side surface facing toward the image side A2. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62; the seventh lens element 70 has an object-side surface 71 and an image-side surface 72; the eighth lens element 80 has an object-side surface 81 and an image-side surface 82, and the ninth lens element 90 has an object-side surface 91 and an image-side surface 92. In addition, each object-side surface and image-side surface in the optical imaging lens 1 of the present invention has an optical axis region and a periphery region.

Each lens element in the optical imaging lens 1 of the present invention further has a thickness T along the optical axis I. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6, the seventh lens element 70 has a seventh lens element thickness T7, the eighth lens element 80 has an eighth lens element thickness T8, the ninth lens element 90 has a ninth lens element thickness T9. Therefore, a sum of nine thicknesses of the nine lens elements from the first lens element 10 to the ninth lens element 90 in the optical imaging lens 1 along the optical axis I is ALT=T1+T2+T3+T4+T5+T6+T7+T8+T9.

In addition, between two adjacent lens elements in the optical imaging lens 1 of the present invention there may be an air gap along the optical axis I. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, an air gap G45 disposed between the fourth lens element 40 and the fifth lens element 50, an air gap G56 disposed between the fifth lens element 50 and the sixth lens element 60, an air gap G67 disposed between the sixth lens element 60 and the seventh lens element 70, an air gap G78 disposed between the seventh lens element 70 and the eighth lens element 80 as well as an air gap G89 disposed between the eighth lens element 80 and the ninth lens element 90. Therefore, a sum of eight air gaps from the first lens element 10 to the ninth lens element 90 along the optical axis I is AAG=G12+G23+G34+G45+G56+G67+G78+G89.

AA15 is a sum of five air gaps from the first lens element 10 to the sixth lens element 60 along the optical axis I, namely the sum of G12, G23, G34, G45, G56; D12t62 is a distance from the image-side 12 surface of the first lens element 10 to the image-side surface 62 of the sixth 60 lens element along the optical axis I, D62t92 is a distance from the image-side surface 62 of the sixth lens element 60 to the image-side surface 92 of the ninth lens element 90 along the optical axis I, D62t82 is a distance from the image-side surface 62 of the sixth lens element 60 to the image-side surface 82 of the eighth lens element 80 along the optical axis I, D12t32 is a distance from the image-side surface 12 of the first lens element 10 to the image-side surface 32 of the third lens element 30 along the optical axis I, D51t62 is a distance from the object-side surface 51 of the fifth lens element 50 to the image-side surface 62 of the sixth lens element 60 along the optical axis I, D32t51 is a distance from the image-side surface 32 of the third lens element 30 to the object-side surface 51 of the fifth lens element 50 along the optical axis I, D41t62 is a distance from the object-side surface 41 of the fourth lens element 40 to the image-side surface 62 of the sixth lens element 60 along the optical axis I, and D11t32 is a distance from the object-side surface 11 of the first lens element 10 to the image-side surface 32 of the third lens element 30 along the optical axis I.

In addition, a distance from the object-side surface 11 of the first lens element 10 to the image plane 4 along the optical axis I is TTL, namely a system length of the optical imaging lens 1; an effective focal length of the optical imaging lens element is EFL; a distance from the object-side surface 11 of the first lens element 10 to the image-side surface 92 of the ninth lens element 90 along the optical axis I is TL; HFOV stands for the half field of view which is half of the field of view of the optical imaging lens 1; ImgH is an image height of the optical imaging lens 1, Fno is an f-number of the optical imaging lens 1, and EPD is an entrance pupil diameter of the optical imaging lens 1, which is EFL divided by Fno, namely EPD=EFL/Fno.

When the filter 3 is placed between the ninth lens element 90 and the image plane 4, an air gap between the ninth lens element 90 and the filter 3 along the optical axis I is G9F; a thickness of the filter 3 along the optical axis I is TF; an air gap between the filter 3 and the image plane 4 along the optical axis I is GFP; and a distance from the image-side surface 92 of the ninth lens element 90 to the image plane 4 along the optical axis I is BFL. Therefore, BFL=G9F+ TF+GFP.

Furthermore, a focal length of the first lens element 10 is f1; a focal length of the second lens element 20 is f2; a focal length of the third lens element 30 is f3; a focal length of the fourth lens element 40 is f4; a focal length of the fifth lens element 50 is f5; a focal length of the sixth lens element 60 is f6; a focal length of the seventh lens element 70 is f7; a focal length of the eighth lens element 80 is f8; a focal length of the ninth lens element 90 is f9; a refractive index of the first lens element 10 is n1; a refractive index of the second lens element 20 is n2; a refractive index of the third lens element 30 is n3; a refractive index of the fourth lens element 40 is n4; a refractive index of the fifth lens element 50 is n5; a refractive index of the sixth lens element 60 is n6; a refractive index of the seventh lens element 70 is n7; a refractive index of the eighth lens element 80 is n8; a refractive index of the ninth lens element 90 is n9; an Abbe number of the first lens element 10 is ν1; an Abbe number of the second lens element 20 is ν2; an Abbe number of the third lens element 30 is ν3; and an Abbe number of the fourth lens element 40 is ν4; an Abbe number of the fifth lens element 50 is ν5; an Abbe number of the sixth lens element 60 is ν6; an Abbe number of the seventh lens element 70 is ν7; an Abbe number of the eighth lens element 80 is ν8 and an Abbe number of the ninth lens element 90 is ν9.

First Embodiment

Figure 7A:
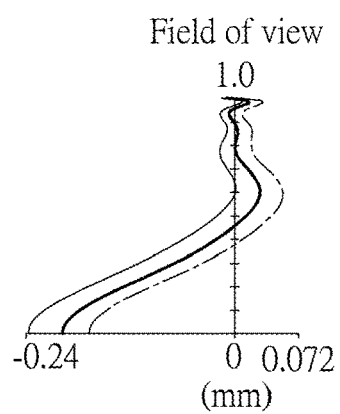
FIG. 7A illustrates the longitudinal spherical aberration on the image plane of the first embodiment.
Figure 7B:
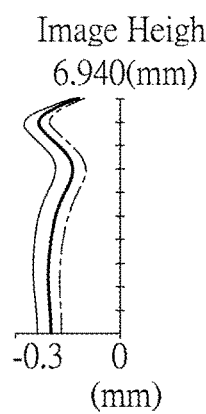
FIG. 7B illustrates the field curvature aberration on the sagittal direction of the first embodiment.
Figure 7C:
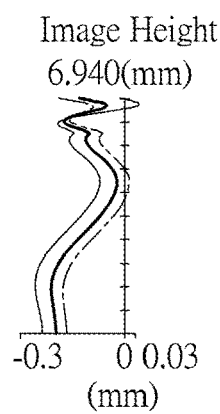
FIG. 7C illustrates the field curvature aberration on the tangential direction of the first embodiment.
Figure 7D:
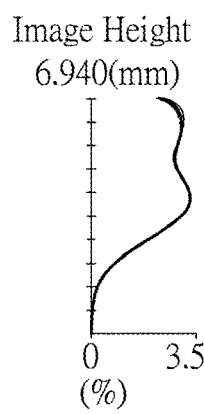
FIG. 7D illustrates the distortion of the first embodiment.

Please refer to FIG. 6 which illustrates the first embodiment of the optical imaging lens 1 of the present invention. Please refer to FIG. 7A for the longitudinal spherical aberration on the image plane 4 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of astigmatic field and the distortion in each embodiment stands for "image height" (ImgH), which is 6.940 mm.

The optical imaging lens 1 of the first embodiment has nine lens elements with refracting power, an aperture stop 2 and an image plane 4. Aperture stop 2 in the first embodiment is provided at a side of the first lens element 10 facing the object side A1.

The first lens element 10 has positive refracting power. An optical axis region 13 of the object-side surface 11 of the first lens element 10 is convex, and a periphery region 14 of the object-side surface 11 of the first lens element 10 is convex. An optical axis region 16 of the image-side surface 12 of the first lens element 10 is concave, and a periphery region 17 of the image-side surface 12 of the first lens element 10 is concave. Besides, both the object-side surface 11 and the image-side surface 12 of the first lens element 10 are aspheric surfaces, but it is not limited thereto.

The second lens element 20 has negative refracting power. An optical axis region 23 of the object-side surface 21 of the second lens element 20 is convex, and a periphery region 24 of the object-side surface 21 of the second lens element 20 is convex. An optical axis region 26 of the image-side surface 22 of the second lens element 20 is concave, and a periphery region 27 of the image-side surface 22 of the second lens element 20 is concave. Besides, both the object-side surface 21 and the image-side surface 22 of the second lens element 20 are aspheric surfaces, but it is not limited thereto.

The third lens element 30 has negative refracting power. An optical axis region 33 of the object-side surface 31 of the third lens element 30 is convex, and a periphery region 34 of the object-side surface 31 of the third lens element 30 is convex. An optical axis region 36 of the image-side surface 32 of the third lens element 30 is concave, and a periphery region 37 of the image-side surface 32 of the third lens element 30 is concave. Besides, both the object-side surface 31 and the image-side surface 32 of the third lens element 30 are aspheric surfaces, but it is not limited thereto.

The fourth lens element 40 has positive refracting power. An optical axis region 43 of the object-side surface 41 of the fourth lens element 40 is convex, and a periphery region 44 of the object-side surface 41 of the fourth lens element 40 is concave. An optical axis region 46 of the image-side surface 42 of the fourth lens element 40 is convex, and a periphery region 47 of the image-side surface 42 of the fourth lens element 40 is convex. Besides, both the object-side surface 41 and the image-side surface 42 of the fourth lens element 40 are aspheric surfaces, but it is not limited thereto.

The fifth lens element 50 has negative refracting power. An optical axis region 53 of the object-side surface 51 of the fifth lens element 50 is concave, and a periphery region 54 of the object-side surface 51 of the fifth lens element 50 is concave. An optical axis region 56 of the image-side surface 52 of the fifth lens element 50 is convex, and a periphery region 57 of the image-side surface 52 of the fifth lens element 50 is convex. Besides, both the object-side surface 51 and the image-side surface 52 of the fifth lens element 50 are aspheric surfaces, but it is not limited thereto.

The sixth lens element 60 has negative refracting power. An optical axis region 63 of the object-side surface 61 of the sixth lens element 60 is convex, and a periphery region 64 of the object-side surface 61 of the sixth lens element 60 is convex. An optical axis region 66 of the image-side surface 62 of the sixth lens element 60 is concave, and a periphery region 67 of the image-side surface 62 of the sixth lens element 60 is convex. Besides, both the object-side surface 61 and the image-side surface 62 of the sixth lens element 60 are aspheric surfaces, but it is not limited thereto.

The seventh lens element 70 has negative refracting power. An optical axis region 73 of the object-side surface 71 of the seventh lens element 70 is concave, and a periphery region 74 of the object-side surface 71 of the seventh lens element 70 is concave. An optical axis region 76 of the image-side surface 72 of the seventh lens element 70 is convex, and a periphery region 77 of the image-side surface 72 of the seventh lens element 70 is convex. Besides, both the object-side surface 71 and the image-side surface 72 of the seventh lens element 70 are aspheric surfaces, but it is not limited thereto.

The eighth lens element 80 has negative refracting power. An optical axis region 83 of the object-side surface 81 of the eighth lens element 80 is convex, and a periphery region 84 of the object-side surface 81 of the eighth lens element 80 is concave. An optical axis region 86 of the image-side surface 82 of the eighth lens element 80 is concave, and a periphery region 87 of the image-side surface 82 of the eighth lens element 80 is convex. Besides, both the object-side surface 81 and the image-side surface 82 of the eighth lens element 80 are aspheric surfaces, but it is not limited thereto.

The ninth lens element 90 has negative refracting power. An optical axis region 93 of the object-side surface 91 of the ninth lens element 90 is concave, and a periphery region 94 of the object-side surface 91 of the ninth lens element 90 is concave. An optical axis region 96 of the image-side surface 92 of the ninth lens element 90 is concave, and a periphery region 97 of the image-side surface 92 of the ninth lens element 90 is convex. Besides, both the object-side surface 91 and the image-side surface 92 of the ninth lens element 90 are aspheric surfaces, but it is not limited thereto.

In the first lens element 10, the second lens element 20, the third lens element 30, the fourth lens element 40, the fifth lens element 50, the sixth lens element 60, the seventh lens element 70, the eighth lens element 80 and the ninth lens element 90 of the optical imaging lens element 1 of the present invention, there are 18 surfaces, such as the object-side surfaces 11/21/31/41/51/61/71/81/91 and the image-side surfaces 12/22/32/42/52/62/72/82/92. If a surface is aspheric, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:
Y represents a vertical distance from a point on aspheric surface to the optical axis;
Z represents a depth of an aspheric surface (the perpendicular distance between the point of aspheric surface at a distance Y from the optical axis and the tangent plane of the vertex on the optical axis of aspheric surface);
R represents the radius of curvature of the lens element surface;
K is a conic constant; and
$a_i$ is an aspheric coefficient of the $i^{th}$ order, and $a_2$ coefficient in each embodiment is 0.

The optical data of the first embodiment of the optical imaging lens 1 are shown in FIG. 24 while aspheric surface data are shown in FIG. 25. In the present embodiments of the optical imaging lens, the f-number of the entire optical imaging lens element system is Fno, EFL is the effective focal length, HFOV stands for the half field of view which is half of the field of view of the entire optical imaging lens element system, and the unit for the radius of curvature, the thickness and the focal length is in millimeters (mm). In this embodiment, EFL=6.883 mm; HFOV=42.147 degrees; TTL=8.745 mm; Fno=1.610; ImgH=6.940 mm.

Second Embodiment

Figure 8:
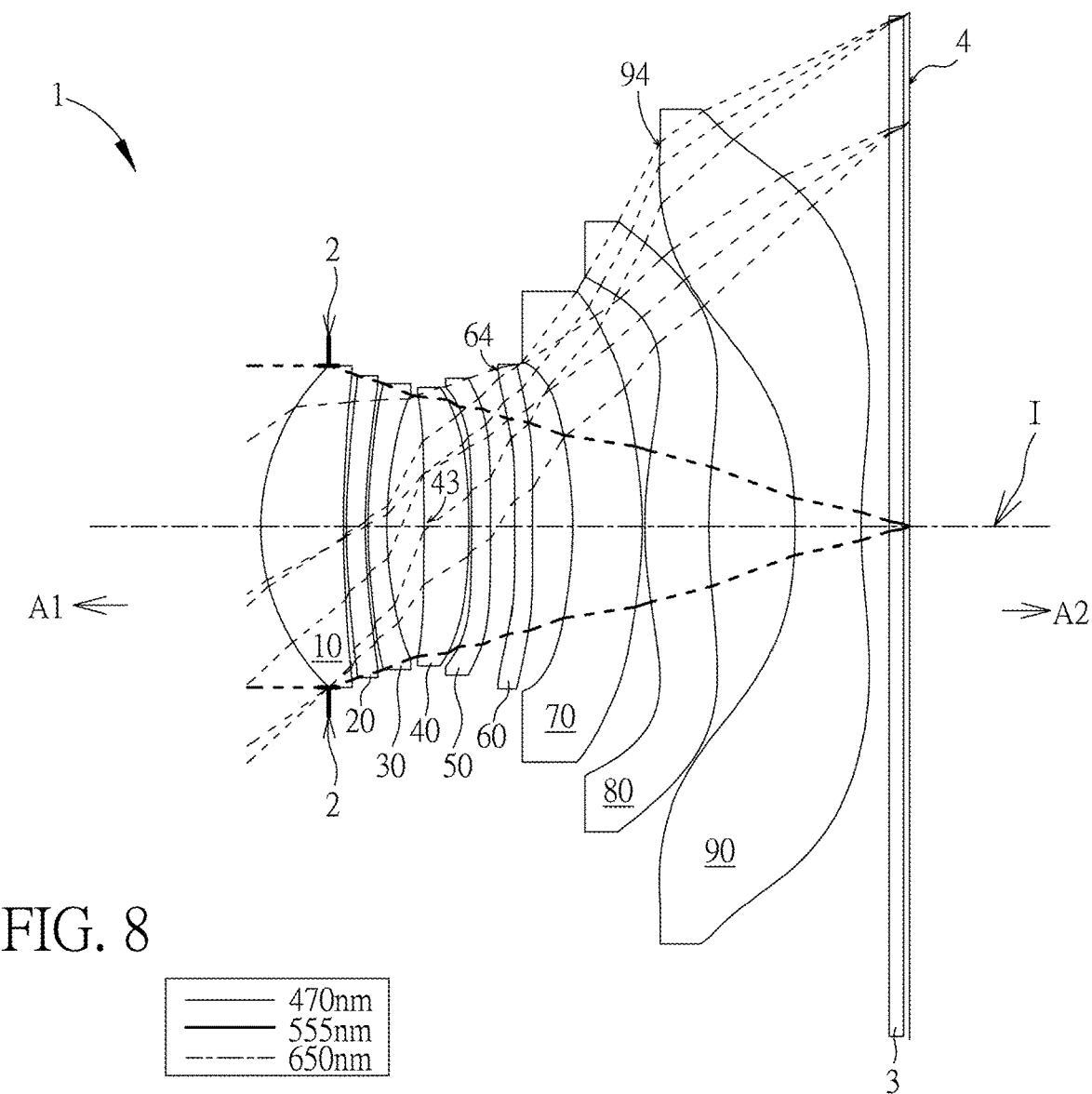
FIG. 8 illustrates a second embodiment of the optical imaging lens of the present invention.
Figure 9A:
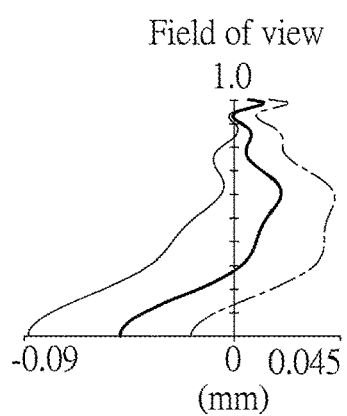
FIG. 9A illustrates the longitudinal spherical aberration on the image plane of the second embodiment.
Figure 9B:
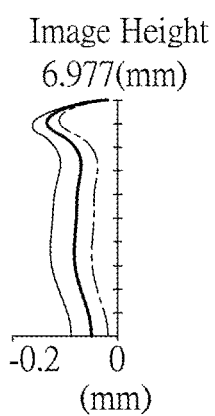
FIG. 9B illustrates the field curvature aberration on the sagittal direction of the second embodiment.
Figure 9C:
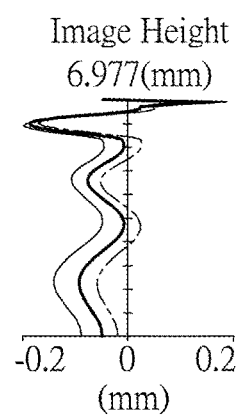
FIG. 9C illustrates the field curvature aberration on the tangential direction of the second embodiment.
Figure 9D:
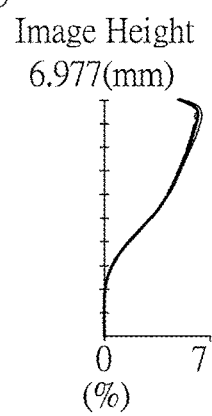
FIG. 9D illustrates the distortion of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as the object-side surface, the image-side surface, the portion in a vicinity of the optical axis and the portion in a vicinity of its periphery will be omitted in the following embodiments. Please refer to FIG. 9A for the longitudinal spherical aberration on the image plane 4 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the radius of curvature, the thickness of the lens element, aspheric surface or the back focal length in this embodiment are different from the optical data in the first embodiment. Besides, in this embodiment, an optical axis region 43 of the object-side surface 41 of the fourth lens element 40 is concave, a periphery region 64 of the object-side surface 61 of the sixth lens element 60 is concave, the seventh lens element 70 has positive refracting power, the eighth lens element 80 has positive refracting power, and a periphery region 94 of the object-side surface 91 of the ninth lens element 90 is convex.

The optical data of the second embodiment of the optical imaging lens are shown in FIG. 26 while aspheric surface data are shown in FIG. 27. In this embodiment, EFL=7.036 mm; HFOV=43.016 degrees; TTL=8.809 mm; Fno=1.610; ImgH=6.977 mm. In particular: 1. the HFOV in this embodiment is larger than the HFOV in the first embodiment; 2. the longitudinal spherical aberration in this embodiment is better than the longitudinal spherical aberration in the first embodiment; 3. the field curvature aberration on the sagittal direction in this embodiment is better than the field curvature aberration on the sagittal direction in the first embodiment.

Third Embodiment

Figure 10:
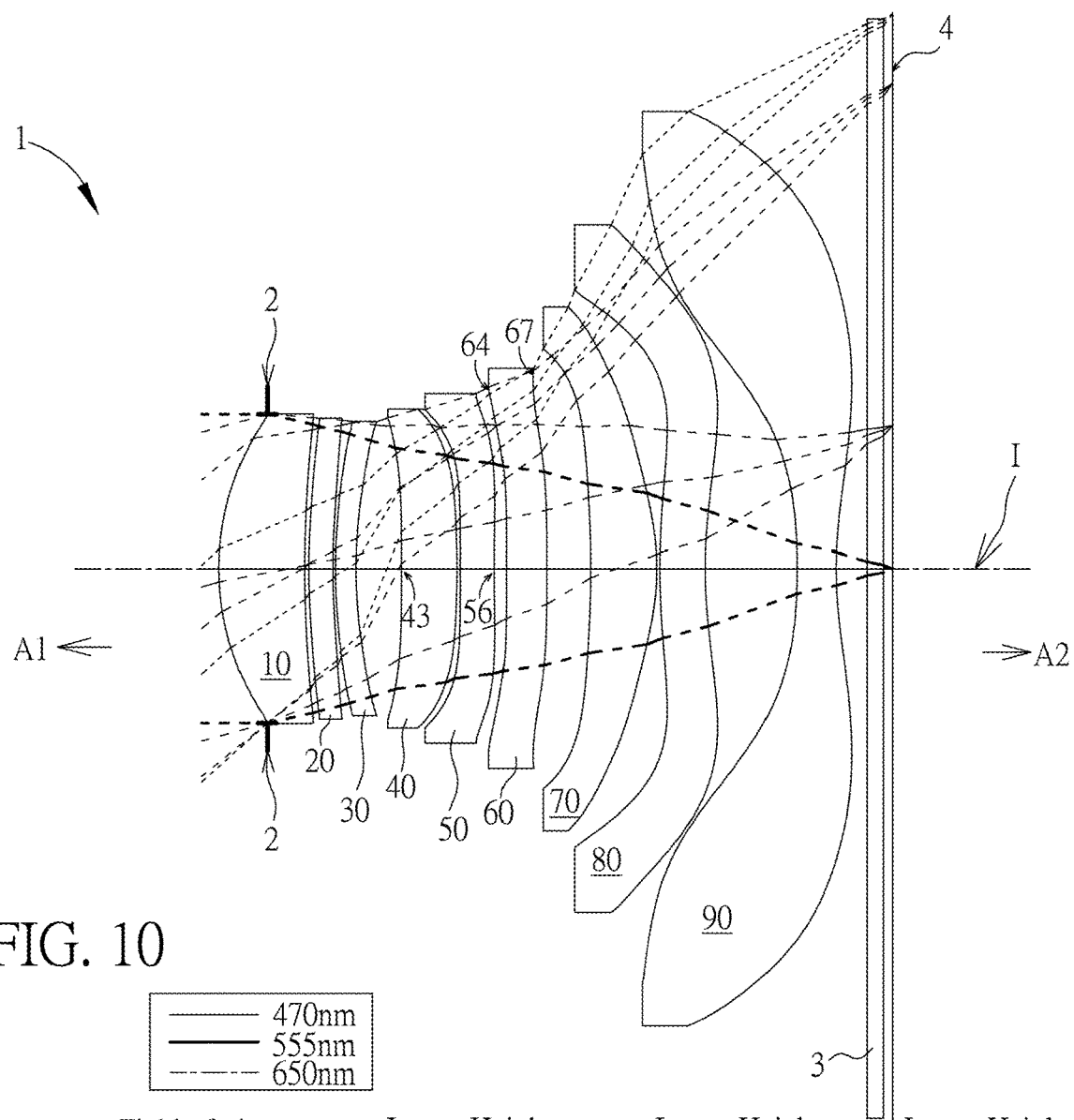
FIG. 10 illustrates a third embodiment of the optical imaging lens of the present invention.
Figures 11A, 11B, 11C, 11D:
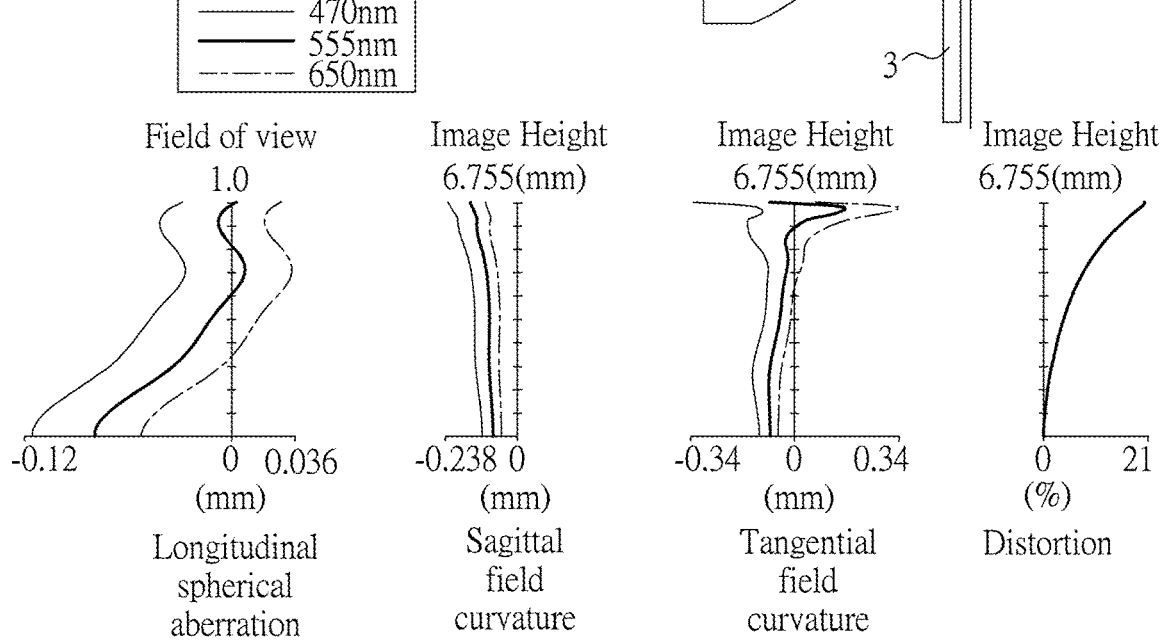
FIG. 11A illustrates the longitudinal spherical aberration on the image plane of the third embodiment.
FIG. 11B illustrates the field curvature aberration on the sagittal direction of the third embodiment.
FIG. 11C illustrates the field curvature aberration on the tangential direction of the third embodiment.
FIG. 11D illustrates the distortion of the third embodiment.

Please refer to FIG. 10 which illustrates the third embodiment of the optical imaging lens 1 of the present invention. Please refer to FIG. 11A for the longitudinal spherical aberration on the image plane 4 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the radius of curvature, the thickness of the lens element, aspheric surface or the back focal length in this embodiment are different from the optical data in the first embodiment. Besides, in this embodiment, the second lens element 20 has positive refracting power, the third lens element 30 has positive refracting power, an optical axis region 43 of the object-side surface 41 of the fourth lens element 40 is concave, an optical axis region 56 of the image-side surface 52 of the fifth lens element 50 is concave, the sixth lens element 60 has positive refracting power, a periphery region 64 of the object-side surface 61 of the sixth lens element 60 is concave, a periphery region 67 of the image-side surface 62 of the sixth lens element 60 is concave, and the seventh lens element 70 has positive refracting power.

The optical data of the third embodiment of the optical imaging lens are shown in FIG. 28 while aspheric surface data are shown in FIG. 29. In this embodiment, EFL=6.071 mm; HFOV=42.147 degrees; TTL=8.220 mm; Fno=1.610; ImgH=6.755 mm. In particular: 1. the system length of the optical imaging lens TTL in this embodiment is shorter than the system length of the optical imaging lens TTL in the first embodiment; 2. the longitudinal spherical aberration in this embodiment is better than the longitudinal spherical aberration in the first embodiment; 3. the field curvature aberration on the sagittal direction in this embodiment is better than the field curvature aberration on the sagittal direction in the first embodiment.

Fourth Embodiment

Figure 12:
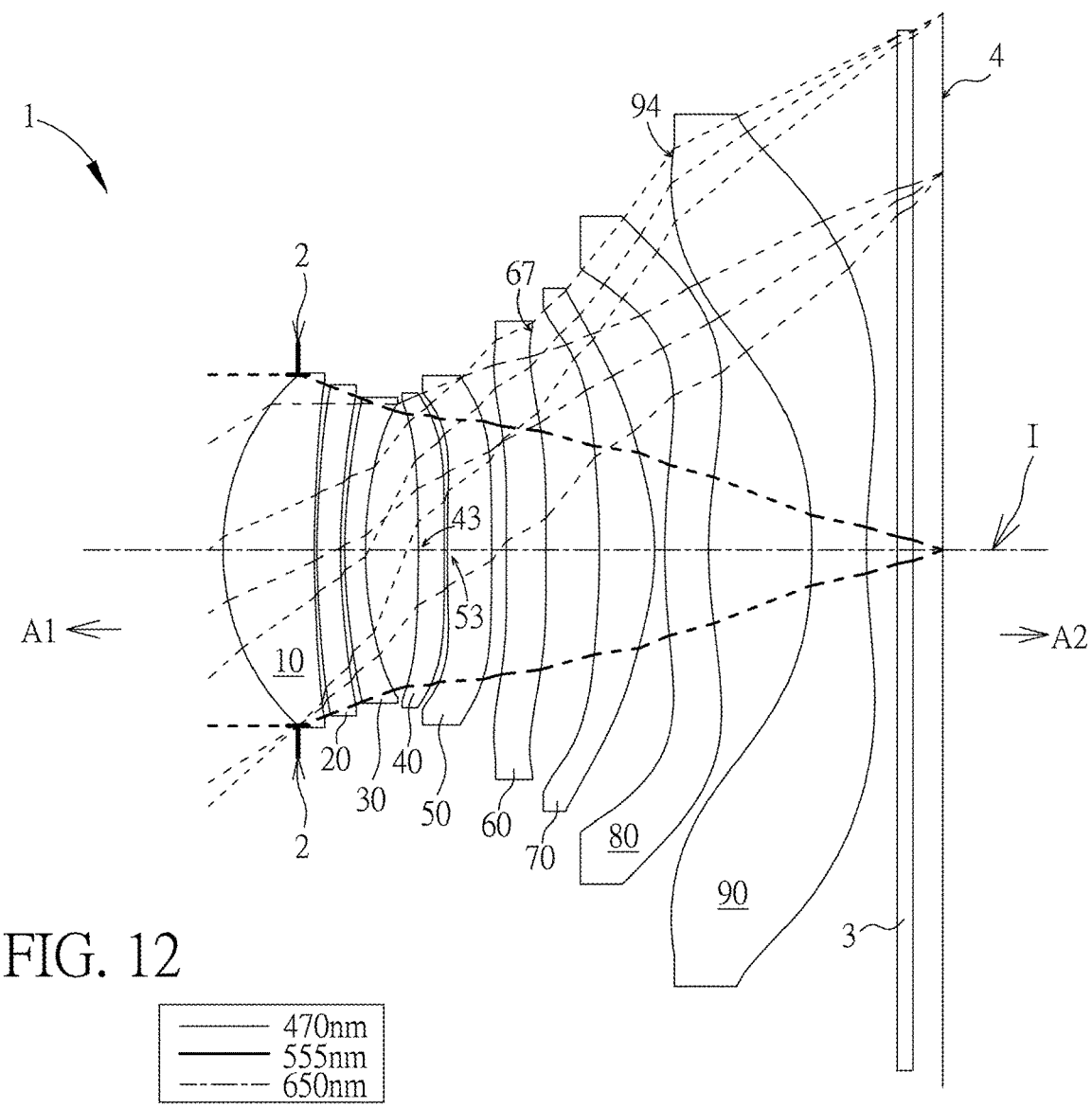
FIG. 12 illustrates a fourth embodiment of the optical imaging lens of the present invention.
Figure 13A:
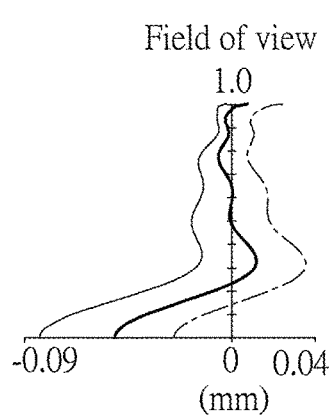
FIG. 13A illustrates the longitudinal spherical aberration on the image plane of the fourth embodiment.
Figure 13B:
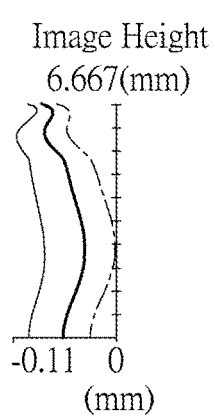
FIG. 13B illustrates the field curvature aberration on the sagittal direction of the fourth embodiment.
Figure 13C:
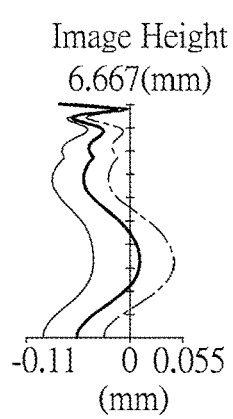
FIG. 13C illustrates the field curvature aberration on the tangential direction of the fourth embodiment.
Figure 13D:
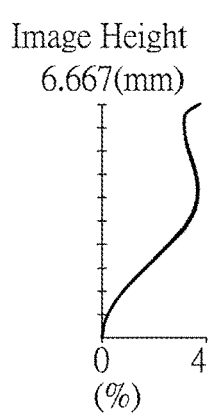
FIG. 13D illustrates the distortion of the fourth embodiment.

Please refer to FIG. 12 which illustrates the fourth embodiment of the optical imaging lens 1 of the present invention. Please refer to FIG. 13A for the longitudinal spherical aberration on the image plane 4 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the radius of curvature, the thickness of the lens element, aspheric surface or the back focal length in this embodiment are different from the optical data in the first embodiment. Besides, in this embodiment, the fourth lens element 40 has negative refracting power, an optical axis region 43 of the object-side surface 41 of the fourth lens element 40 is concave, the fifth lens element 50 has positive refracting power, an optical axis region 53 of the object-side surface 51 of the fifth lens element 50 is convex, the sixth lens element 60 has positive refracting power, a periphery region 67 of the image-side surface 62 of the sixth lens element 60 is concave, the seventh lens element 70 has positive refracting power, and a periphery region 94 of the object-side surface 91 of the ninth lens element 90 is convex.

The optical data of the fourth embodiment of the optical imaging lens are shown in FIG. 30 while aspheric surface data are shown in FIG. 31. In this embodiment, EFL=7.003 mm; HFOV=42.155 degrees; TTL=8.899 mm; Fno=1.610; ImgH=6.667 mm. In particular: 1. the HFOV in this embodiment is larger than the HFOV in the first embodiment; 2. the longitudinal spherical aberration in this embodiment is better than the longitudinal spherical aberration in the first embodiment; 3. the field curvature aberration on the sagittal direction in this embodiment is better than the field curvature aberration on the sagittal direction in the first embodiment; 4. the field curvature aberration on the tangential direction in this embodiment is better than the field curvature aberration on the tangential direction in the first embodiment.

Fifth Embodiment

Figure 14:
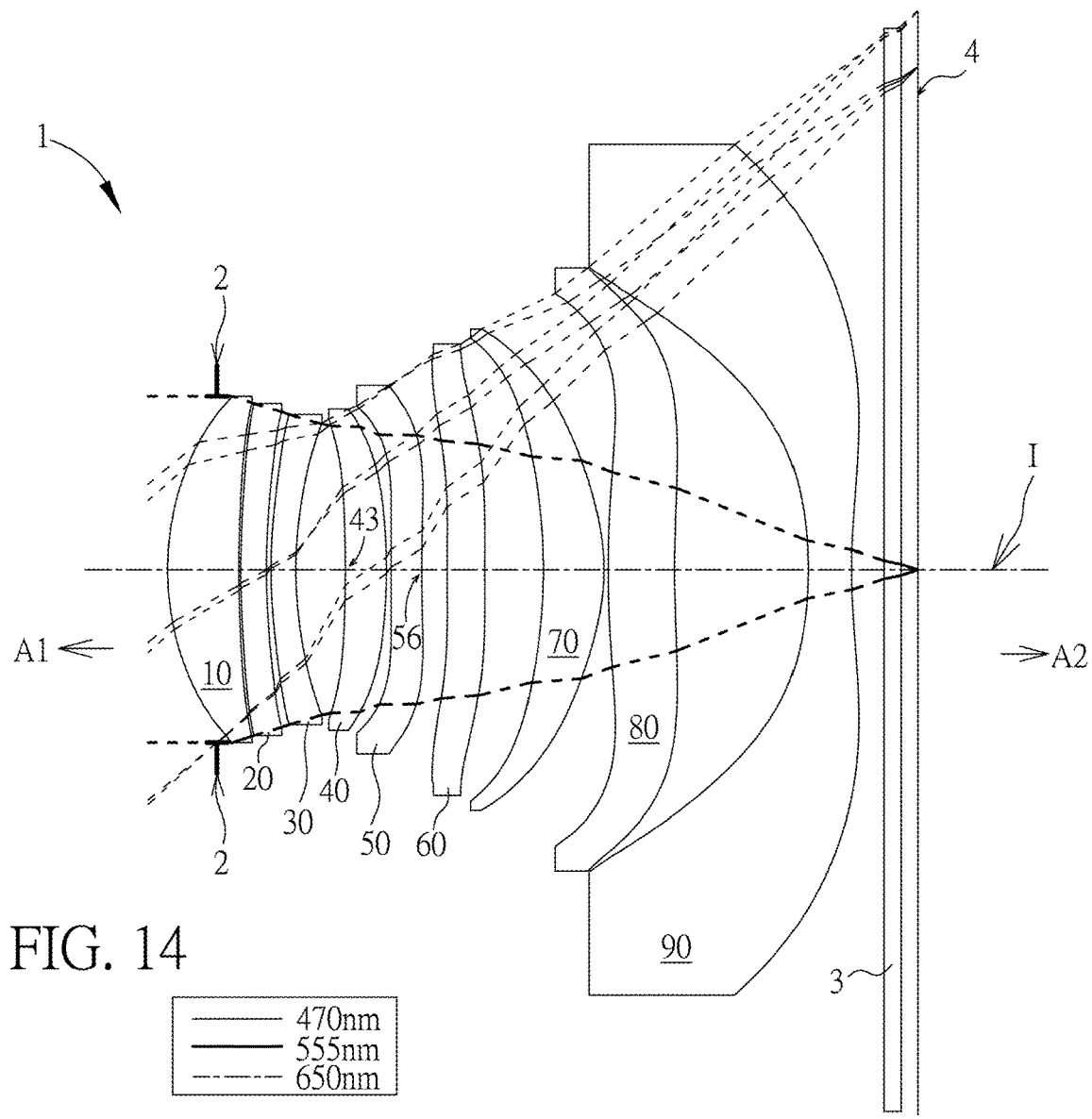
FIG. 14 illustrates a fifth embodiment of the optical imaging lens of the present invention.
Figures 15A, 15B, 15C, 15D:
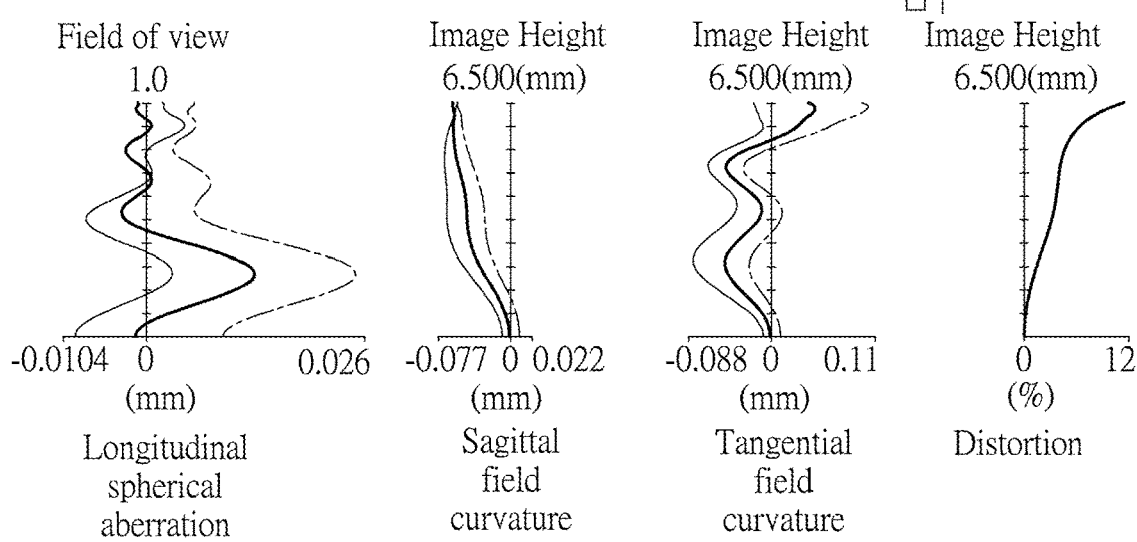
FIG. 15A illustrates the longitudinal spherical aberration on the image plane of the fifth embodiment.
FIG. 15B illustrates the field curvature aberration on the sagittal direction of the fifth embodiment.
FIG. 15C illustrates the field curvature aberration on the tangential direction of the fifth embodiment.
FIG. 15D illustrates the distortion of the fifth embodiment.

Please refer to FIG. 14 which illustrates the fifth embodiment of the optical imaging lens 1 of the present invention. Please refer to FIG. 15A for the longitudinal spherical aberration on the image plane 4 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the radius of curvature, the thickness of the lens element, aspheric surface or the back focal length in this embodiment are different from the optical data in the first embodiment. Besides, in this embodiment, an optical axis region 43 of the object-side surface 41 of the fourth lens element 40 is concave, an optical axis region 56 of the image-side surface 52 of the fifth lens element 50 is concave, the sixth lens element 60 has positive refracting power, the seventh lens element 70 has positive refracting power, and the eighth lens element 80 has positive refracting power.

The optical data of the fifth embodiment of the optical imaging lens are shown in FIG. 32 while aspheric surface data are shown in FIG. 33. In this embodiment, EFL=6.490 mm; HFOV=41.940 degrees; TTL=8.718 mm; Fno=1.610; ImgH=6.500 mm. In particular: 1. the system length of the optical imaging lens TTL in this embodiment is shorter than the system length of the optical imaging lens TTL in the first embodiment; 2. the longitudinal spherical aberration in this embodiment is better than the longitudinal spherical aberration in the first embodiment; 3. the field curvature aberration on the sagittal direction in this embodiment is better than the field curvature aberration on the sagittal direction in the first embodiment; 4. the field curvature aberration on the tangential direction in this embodiment is better than the field curvature aberration on the tangential direction in the first embodiment.

Sixth Embodiment

Please refer to FIG. 16 which illustrates the sixth embodiment of the optical imaging lens 1 of the present invention. Please refer to FIG. 17A for the longitudinal spherical aberration on the image plane 4 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the radius of curvature, the thickness of the lens element, aspheric surface or the back focal length in this embodiment are different from the optical data in the first embodiment. Besides, in this embodiment, an optical axis region 43 of the object-side surface 41 of the fourth lens element 40 is concave, an optical axis region 53 of the object-side surface 51 of the fifth lens element 50 is convex, an optical axis region 56 of the image-side surface 52 of the fifth lens element 50 is concave, the sixth lens element 60 has positive refracting power, a periphery region 67 of the image-side surface 62 of the sixth lens element 60 is concave, the seventh lens element 70 has positive refracting power, the ninth lens element 90 has positive refracting power, and an optical axis region 93 of the object-side surface 91 of the ninth lens element 90 is convex.

The optical data of the sixth embodiment of the optical imaging lens are shown in FIG. 34 while aspheric surface data are shown in FIG. 35. In this embodiment, EFL=5.918 mm; HFOV=41.907 degrees; TTL=8.549 mm; Fno=1.610; ImgH=6.500 mm. In particular: 1. the system length of the optical imaging lens TTL in this embodiment is shorter than the system length of the optical imaging lens TTL in the first embodiment; 2. the longitudinal spherical aberration in this embodiment is better than the longitudinal spherical aberration in the first embodiment; 3. the field curvature aberration on the sagittal direction in this embodiment is better than the field curvature aberration on the sagittal direction in the first embodiment.

Seventh Embodiment

Figure 18:
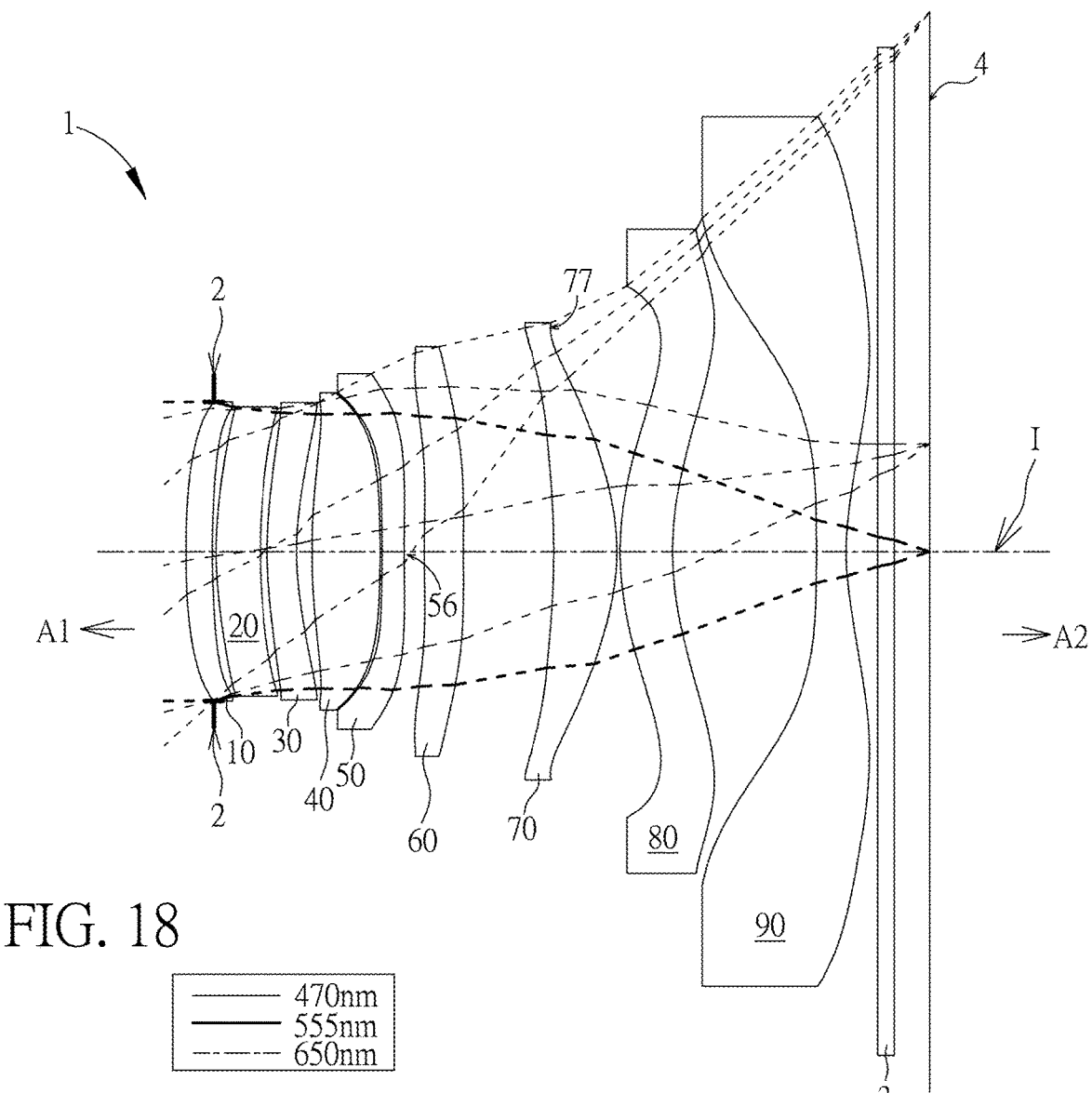
FIG. 18 illustrates a seventh embodiment of the optical imaging lens of the present invention.
Figures 19A, 19B, 19C, 19D:
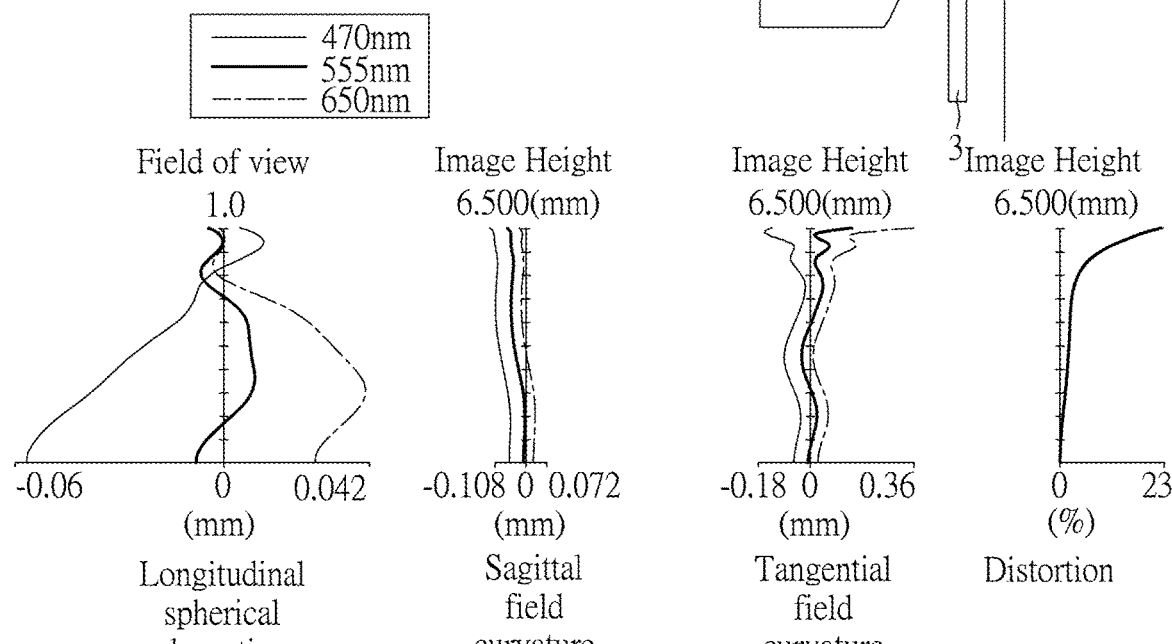
FIG. 19A illustrates the longitudinal spherical aberration on the image plane of the seventh embodiment.
FIG. 19B illustrates the field curvature aberration on the sagittal direction of the seventh embodiment.
FIG. 19C illustrates the field curvature aberration on the tangential direction of the seventh embodiment.
FIG. 19D illustrates the distortion of the seventh embodiment.

Please refer to FIG. 18 which illustrates the seventh embodiment of the optical imaging lens 1 of the present invention. Please refer to FIG. 19A for the longitudinal spherical aberration on the image plane 4 of the seventh embodiment; please refer to FIG. 19B for the field curvature aberration on the sagittal direction; please refer to FIG. 19C for the field curvature aberration on the tangential direction, and please refer to FIG. 19D for the distortion aberration. The components in this embodiment are similar to those in the first embodiment, but the optical data such as the radius of curvature, the thickness of the lens element, aspheric surface or the back focal length in this embodiment are different from the optical data in the first embodiment. Besides, in this embodiment, the first lens element 10 has negative refracting power, the second lens element 20 has positive refracting power, an optical axis region 56 of the image-side surface 52 of the fifth lens element 50 is concave, the sixth lens element 60 has positive refracting power, the seventh lens element 70 has positive refracting power, a periphery region 77 of the image-side surface 72 of the seventh lens element 70 is concave, and the eighth lens element 80 has positive refracting power.

The optical data of the seventh embodiment of the optical imaging lens are shown in FIG. 36 while aspheric surface data are shown in FIG. 37. In this embodiment, EFL=5.837 mm; HFOV=42.240 degrees; TTL=9.015 mm; Fno=1.610; ImgH=6.500 mm. In particular: 1. the HFOV in this embodiment is larger than the HFOV in the first embodiment; 2. the longitudinal spherical aberration in this embodiment is better than the longitudinal spherical aberration in the first embodiment; 3. the field curvature aberration on the sagittal direction in this embodiment is better than the field curvature aberration on the sagittal direction in the first embodiment.

Eighth Embodiment

Figure 20:
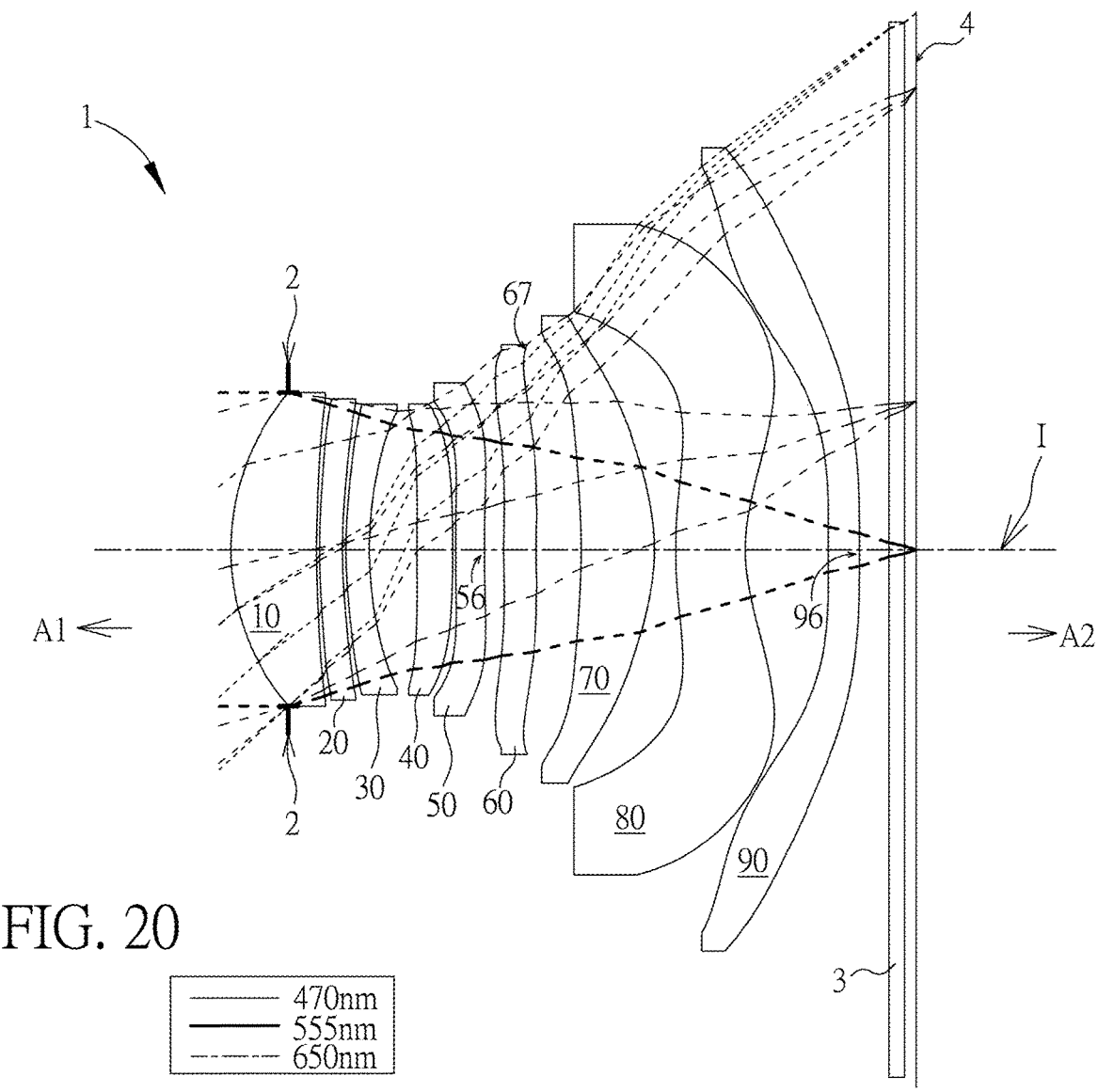
FIG. 20 illustrates an eighth embodiment of the optical imaging lens of the present invention.
Figures 21A, 21B, 21C, 21D:
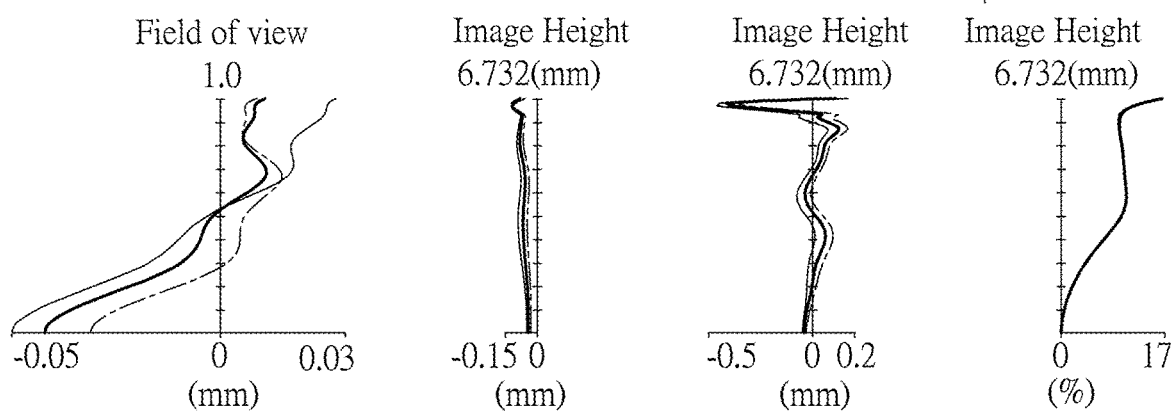
FIG. 21A illustrates the longitudinal spherical aberration on the image plane of the eighth embodiment.
FIG. 21B illustrates the field curvature aberration on the sagittal direction of the eighth embodiment.
FIG. 21C illustrates the field curvature aberration on the tangential direction of the eighth embodiment.
FIG. 21D illustrates the distortion of the eighth embodiment.

Please refer to FIG. 20 which illustrates the eighth embodiment of the optical imaging lens 1 of the present invention. Please refer to FIG. 21A for the longitudinal spherical aberration on the image plane 4 of the eighth embodiment; please refer to FIG. 21B for the field curvature aberration on the sagittal direction; please refer to FIG. 21C for the field curvature aberration on the tangential direction, and please refer to FIG. 21D for the distortion aberration. The components in this embodiment are similar to those in the first embodiment, but the optical data such as the radius of curvature, the thickness of the lens element, aspheric surface or the back focal length in this embodiment are different from the optical data in the first embodiment. Besides, in this embodiment, an optical axis region 56 of the image-side surface 52 of the fifth lens element 50 is concave, the sixth lens element 60 has positive refracting power, a periphery region 67 of the image-side surface 62 of the sixth lens element 60 is concave, the seventh lens element 70 has positive refracting power, the ninth lens element 90 has positive refracting power, and an optical axis region 96 of the image-side surface 92 of the ninth lens element 90 is convex.

The optical data of the eighth embodiment of the optical imaging lens are shown in FIG. 38 while aspheric surface data are shown in FIG. 39. In this embodiment, EFL=6.531 mm; HFOV=42.147 degrees; TTL=8.855 mm; Fno=1.610; ImgH=6.732 mm. In particular: 1. the longitudinal spherical aberration in this embodiment is better than the longitudinal spherical aberration in the first embodiment; 2. the field curvature aberration on the sagittal direction in this embodiment is better than the field curvature aberration on the sagittal direction in the first embodiment.

Ninth Embodiment

Figure 22:
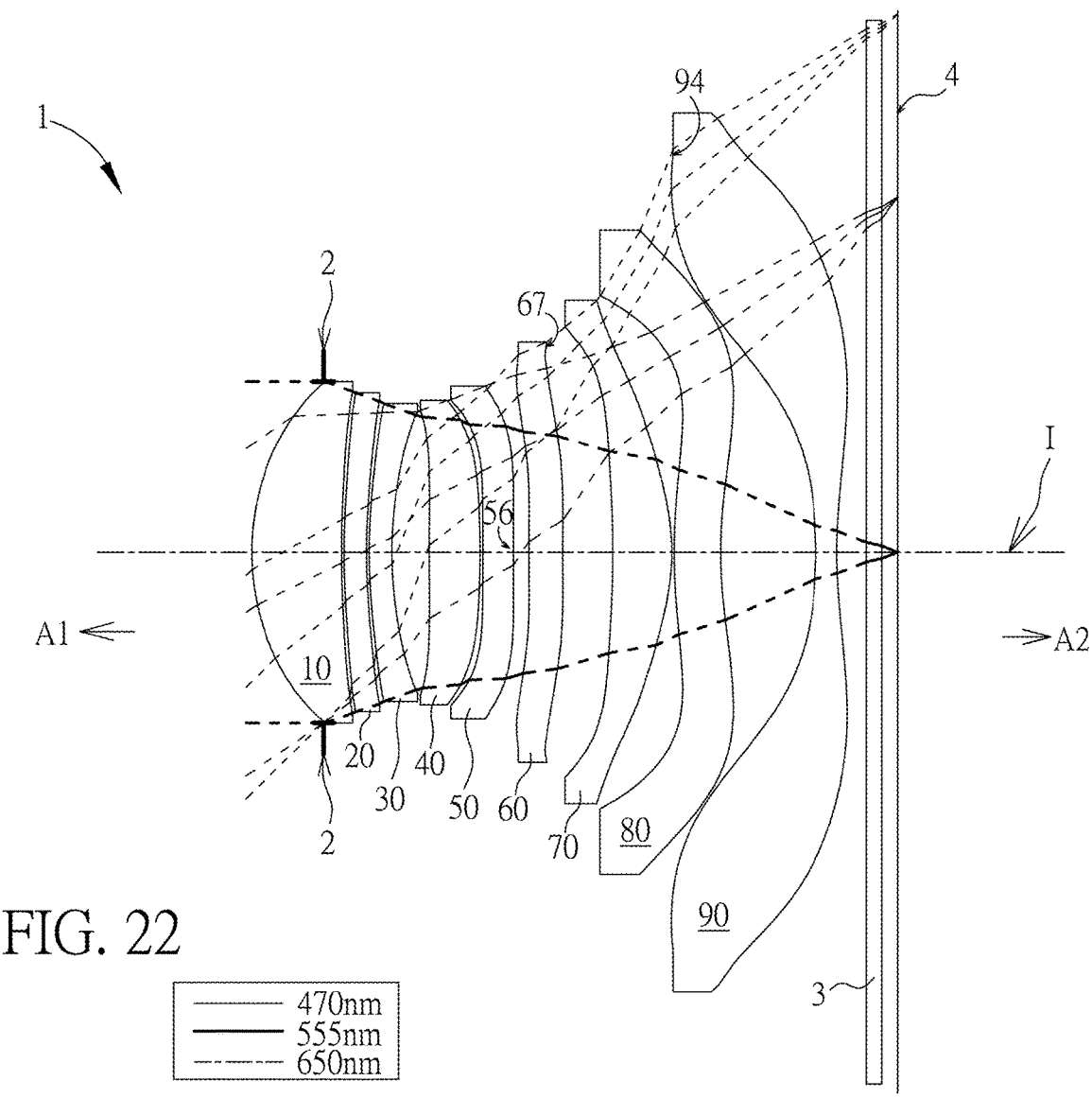
FIG. 22 illustrates a ninth embodiment of the optical imaging lens of the present invention.
Figures 23A, 23B, 23C, 23D:
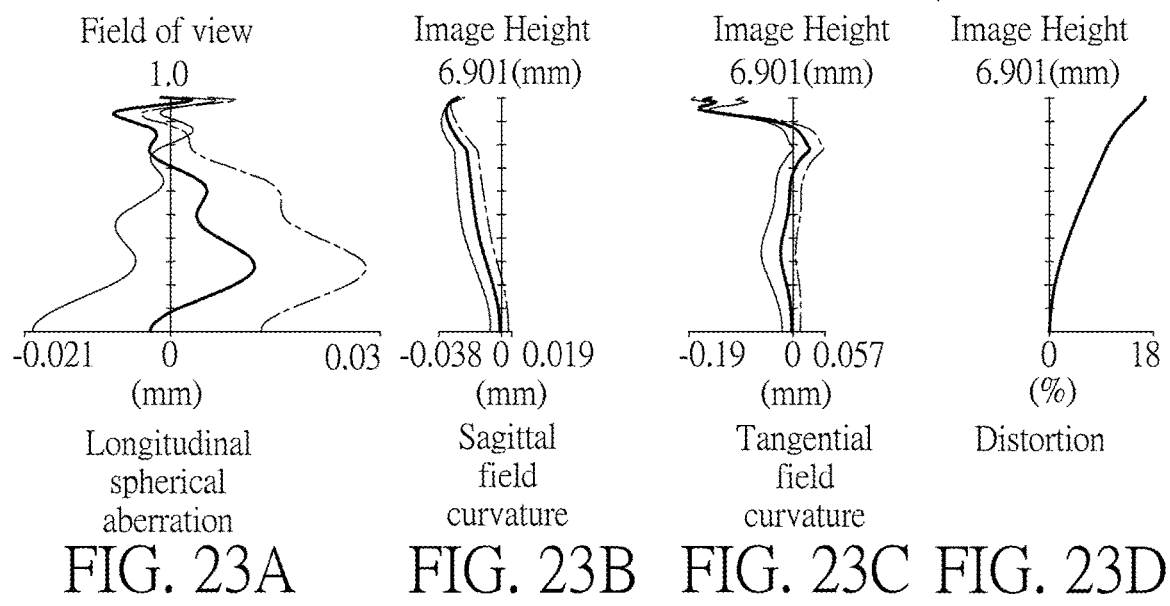
FIG. 23A illustrates the longitudinal spherical aberration on the image plane of the ninth embodiment.
FIG. 23B illustrates the field curvature aberration on the sagittal direction of the ninth embodiment.
FIG. 23C illustrates the field curvature aberration on the tangential direction of the ninth embodiment.
FIG. 23D illustrates the distortion of the ninth embodiment.

Please refer to FIG. 22 which illustrates the ninth embodiment of the optical imaging lens 1 of the present invention. Please refer to FIG. 23A for the longitudinal spherical aberration on the image plane 4 of the ninth embodiment; please refer to FIG. 23B for the field curvature aberration on the sagittal direction; please refer to FIG. 23C for the field curvature aberration on the tangential direction, and please refer to FIG. 23D for the distortion aberration. The components in this embodiment are similar to those in the first embodiment, but the optical data such as the radius of curvature, the thickness of the lens element, aspheric surface or the back focal length in this embodiment are different from the optical data in the first embodiment. Besides, in this embodiment, an optical axis region 56 of the image-side surface 52 of the fifth lens element 50 is concave, the sixth lens element 60 has positive refracting power, a periphery region 67 of the image-side surface 62 of the sixth lens element 60 is concave, the seventh lens element 70 has positive refracting power, and a periphery region 94 of the object-side surface 91 of the ninth lens element 90 is convex.

The optical data of the ninth embodiment of the optical imaging lens are shown in FIG. 40 while aspheric surface data are shown in FIG. 41. In this embodiment, EFL=6.098 mm; HFOV=44.136 degrees; TTL=8.288 mm; Fno=1.390; ImgH=6.901 mm. In particular: 1. the system length of the optical imaging lens TTL in this embodiment is shorter than the system length of the optical imaging lens TTL in the first embodiment; 2. the Fno in this embodiment is smaller than the Fno in the first embodiment; 3. the HFOV in this embodiment is larger than the HFOV in the first embodiment; 4. the longitudinal spherical aberration in this embodiment is better than the longitudinal spherical aberration in the first embodiment; 5. the field curvature aberration on the sagittal direction in this embodiment is better than the field curvature aberration on the sagittal direction in the first embodiment; 6. the field curvature aberration on the tangential direction in this embodiment is better than the field curvature aberration on the tangential direction in the first embodiment.

Some important ratios in each embodiment are shown in FIG. 42 and in FIG. 43.

Each embodiment of the present invention provides an optical imaging lens 1 with smaller Fno, larger image height and improved resolution while it is beneficial to maintain the system length, to maintain good imaging quality and to be technically plausible:

1. When the optical imaging lens element of the present invention satisfies that a periphery region 44 of the object-side surface 41 of the fourth lens element 40 is concave, an optical axis region 46 of the image-side surface 42 of the fourth lens element 40 is convex, and an optical axis region 73 of the object-side surface 71 of the seventh lens element 70 is concave, it is conducive to design a lens of a larger aperture stop and of a larger image height. The optical imaging lens element may be further limited to that an optical axis region 86 of the image-side surface 82 of the eighth lens element 80 is concave, an optical axis region 93 of the object-side surface 91 of the ninth lens element 90 is concave and $v5+v9\leq100.000$, it is conducive to reduce the system length TTL, and to let the ray transfer in the outer field of view (0.6~1.0 field of view) become smooth to reduce the sensitivity and to enhance manufacturability. The more preferable range is $38.000\leq v5+v9\leq100.000$.

2. When the optical imaging lens element of the present invention satisfies that a periphery region 34 of the object-side surface 31 of the third lens element 30 is convex, a periphery region 44 of the object-side surface 41 of the fourth lens element 40 is concave and an optical axis region 73 of the object-side surface 71 of the seventh lens element 70 is concave, it is conducive to design a lens of a larger aperture stop and of a larger image height. The optical imaging lens element may be further limited to that the first lens element 10 has positive refracting power, the second lens element 20 has negative refracting power, an optical axis region 96 of the image-side surface 92 of the ninth lens element 90 is concave and $v8+v9\leq100.000$, it is conducive to reduce the system length TTL, and to let the ray transfer in the outer field of view (0.6~1.0 field of view) become smooth to reduce the sensitivity and to enhance manufacturability. The more preferable range is $38.000\leq v8+v9\leq100.000$.

3. When the optical imaging lens element of the present invention satisfies that a periphery region 37 of the image-side surface 32 of the third lens element 30 is concave, a periphery region 54 of the object-side surface 51 of the fifth lens element 50 is concave and an optical axis region 73 of the object-side surface 71 of the seventh lens element 70 is concave, it is conducive to design a lens of a larger aperture stop and of a larger image height. The optical imaging lens element may be further limited to that an optical axis region 63 of the object-side surface 61 of the sixth lens element 60 is convex, an optical axis region 96 of the image-side surface 92 of the ninth lens element 90 is concave, a periphery region 97 of the image-side surface 92 of the ninth lens element 90 is convex and $v8+v9\leq100.000$, it is conducive to reduce the system length TTL, and to let the ray transfer in the outer field of view (0.6~1.0 field of view) become smooth to reduce the sensitivity and to enhance manufacturability. The more preferable range is $38.000\leq v8+v9\leq100.000$.

4. When the optical imaging lens element of the present invention satisfies $v5+v6\leq100.000$, $v3+v9\leq100.000$ or $v7+v8+v9\leq135.000$, it is conducive to enhance the modulation transfer function (MTF) of the optical imaging lens element to increase the resolution. The preferable ranges are $38.000\leq v5+v6\leq100.000$, $38.000\leq v3+v9\leq100.000$ or $57.000\leq v7+v8+v9\leq135.000$, and the more preferable ranges are $74.000\leq v5+v6\leq100.000$, $38.000\leq v3+v9\leq80.000$ or $93.000\leq v7+v8+v9\leq135.000$.

5. If the following conditional formulae of the optical imaging lens 1 of the present invention are optionally satisfied, it may keep the thicknesses and gaps of each lens element in suitable ranges and from that the parameters are too great to shrink the optical imaging lens, or too small to assemble, or the difficulty of the fabrication may be increased while it helps provide a larger aperture stop and a large image height:

1) $Fno*AA15/T2\leq6.000$, and the preferable range is $1.500\leq Fno*AA15/T2\leq6.000$;
2) $4.000\leq(EPD+TTL)/D12t62$, and the preferable range is $4.000\leq(EPD+TTL)/D12t62\leq6.300$;
3) $3.200\leq(T1+D62t92)/(AA15+T6)$, and the preferable range is $3.200\leq(T1+D62t92)/(AA15+T6)\leq6.500$;
4) $(AAG+BFL)/D62t82\leq3.900$, and the preferable range is $2.000\leq(AAG+BFL)/D62t82\leq3.900$;
5) $26.000$ degrees$\leq HFOV/Fno$, and the preferable range is $26.000$ degrees$\leq HFOV/Fno\leq32.000$ degrees;
6) $(D12t32+D51t62)/D32t51\leq2.100$, and the preferable range is $1.000\leq(D12t32+D51t62)/D32t51\leq2.100$;
7) $D41t62/(T3+G34)\leq3.400$, and the preferable range is $1.600\leq D41t62/(T3+G34)\leq3.400$;
8) $Fno*D11t32/T7\leq4.300$, and the preferable range is $2.400\leq Fno*D11t32/T7\leq4.300$;
9) $D11t32/G67\leq3.400$, and the preferable range is $1.200\leq D11t32/G67\leq3.400$;
10) $5.000\leq(ALT+EPD)/D11t32$, and the preferable range is $5.000\leq(ALT+EPD)/D11t32\leq7.300$;
11) $Fno*D11t62/(T7+T8+T9)\leq3.600$, and the preferable range is $1.900\leq Fno*D11t62/(T7+T8+T9)\leq3.600$;
12) $D41t62/G67\leq3.600$, and the preferable range is $1.600\leq D41t62/G67\leq3.600$;
13) $(D12t32+D51t62)/T8\leq3.500$, and the preferable range is $1.200\leq(D12t32+D51t62)/T8\leq3.500$;
14) $(AA15+T6)/G67\leq2.500$, and the preferable range is $0.900\leq(AA15+T6)/G67\leq2.500$;
15) $13.000$ degrees/mm$\leq HFOV/D12t62$, and the preferable range is $13.000$ degrees/mm$\leq HFOV/D12t62\leq20.000$ degrees/mm;
16) $5.700\leq(EPD+TL)/(D12t32+D51t62)$, and the preferable range is $5.700\leq(EPD+TL)/(D12t32+D51t62)\leq11.000$;
17) $2.700\leq(ImgH+EPD)/(D12t32+D41t62)$, and the preferable range is $2.700\leq(ImgH+EPD)/(D12t32+D41t62)\leq6.000$;
18) $2.300\leq(EFL+EPD)/(D12t32+D41t62)$, and the preferable range is $2.300\leq(EFL+EPD)/(D12t32+D41t62)\leq6.000$.

In addition, any arbitrary combination of the parameters of the embodiments can be selected to increase the lens limitation so as to facilitate the design of the same structure of the present invention.

In the light of the unpredictability of the optical imaging lens, the present invention suggests above principles to have a reduced system length of the optical imaging lens, a larger aperture stop available, enhanced imaging quality or a better fabrication yield to overcome the drawbacks of prior art.

In addition to the above ratios, one or more conditional formulae may be optionally combined to be used in the embodiments of the present invention and the present invention is not limit to this. The concave or convex configuration of each lens element or multiple lens elements may be fine-tuned to enhance the performance and/or the resolution. The above limitations may be selectively combined in the embodiments without causing inconsistency.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Those skilled in art will readily observe that numerous modifications and alterations of the device and method may be made while retaining the teachings of the invention. Accordingly, above disclosure should be construed as limited only by the metes and bounds of appended claims.

What is claimed is:

1. An optical imaging lens, from an object side to an image side in order along an optical axis comprising: a first lens element, a second lens element, a third lens element, a fourth lens element, a fifth lens element, a sixth lens element, a seventh lens element, an eighth lens element and a ninth lens element, the first lens element to the ninth lens element each having an object-side surface facing toward the object side and allowing imaging rays to pass through as well as an image-side surface facing toward the image side and allowing the imaging rays to pass through, wherein:
   a periphery region of the object-side surface of the fourth lens element is concave;
   an optical axis region of the image-side surface of the fourth lens element is convex;
   an optical axis region of the object-side surface of the seventh lens element is concave;
   an optical axis region of the image-side surface of the eighth lens element is concave; and
   an optical axis region of the object-side surface of the ninth lens element is concave;
   wherein lens elements included by the optical imaging lens are only the nine lens elements described above, D41t62 is defined as a distance from the object-side surface of the fourth lens element to the image-side surface of the sixth lens element along the optical axis, G67 is an air gap between the sixth lens element and the seventh lens element along the optical axis, an Abbe number of the fifth lens element is ν5 and an Abbe number of the ninth lens element is ν9 to satisfy ν5+ν9≤100.000 and D41t62/G67≤3.600.

2. The optical imaging lens of claim 1, wherein ν6 is an Abbe number of the sixth lens element, and the optical imaging lens satisfies the relationship:

ν5+ν6≤100.000.

3. The optical imaging lens of claim 1, wherein Fno is an f-number of the optical imaging lens, AA15 is a sum of five air gaps from the first lens element to the sixth lens element along the optical axis, T2 is a thickness of the second lens element along the optical axis, and the optical imaging lens satisfies the relationship:

Fno*$AA15/T2$≤6.000.

4. The optical imaging lens of claim 1, wherein EPD is an entrance pupil diameter of the optical imaging lens, TTL is the distance from the object-side surface of the first lens element to an image plane along the optical axis, D12t62 is defined as a distance from the image-side surface of the first lens element to the image-side surface of the sixth lens element along the optical axis, and the optical imaging lens satisfies the relationship: 4.000≤(EPD+TTL)/D12t62.

5. The optical imaging lens of claim 1, wherein T1 is a thickness of the first lens element along the optical axis, T6 is a thickness of the sixth lens element along the optical axis, AA15 is a sum of five air gaps from the first lens element to the sixth lens element along the optical axis, D62t92 is defined as a distance from the image-side surface of the sixth lens element to the image-side surface of the ninth lens element along the optical axis, and the optical imaging lens satisfies the relationship:

3.200≤$(T1+D62t92)/(AA15+T6)$.

6. The optical imaging lens of claim 1, wherein AAG is a sum of eight air gaps from the first lens element to the ninth lens element along the optical axis, BFL is a distance from the image-side surface of the ninth lens element to an image plane along the optical axis, D62t82 is defined as a distance from the image-side surface of the sixth lens element to the image-side surface of the eighth lens element along the optical axis, and the optical imaging lens satisfies the relationship:

(AAG+BFL)/$D62t82$≤3.900.

7. The optical imaging lens of claim 1, wherein HFOV stands for the half field of view of the optical imaging lens, Fno is an f-number of the optical imaging lens, and the optical imaging lens satisfies the relationship:

26.000 degrees≤HFOV/Fno.

8. An optical imaging lens, from an object side to an image side in order along an optical axis comprising: a first lens element, a second lens element, a third lens element, a fourth lens element, a fifth lens element, a sixth lens element, a seventh lens element, an eighth lens element and a ninth lens element, the first lens element to the ninth lens element each having an object-side surface facing toward the object side and allowing imaging rays to pass through as well as an image-side surface facing toward the image side and allowing the imaging rays to pass through, wherein:

the first lens element has positive refracting power,
the second lens element has negative refracting power;
a periphery region of the object-side surface of the third lens element is convex;
a periphery region of the object-side surface of the fourth lens element is concave;
an optical axis region of the object-side surface of the seventh lens element is concave; and
an optical axis region of the image-side surface of the ninth lens element is concave;
wherein lens elements included by the optical imaging lens are only the nine lens elements described above, D41t62 is defined as a distance from the object-side surface of the fourth lens element to the image-side surface of the sixth lens element along the optical axis, T3 is a thickness of the third lens element along the optical axis, G34 is an air gap between the third lens element and the fourth lens element along the optical axis, an Abbe number of the eighth lens element is ν8 and an Abbe number of the ninth lens element is ν9 to satisfy ν8+ν9≤100.000 and D41t62/(T3+G34)≤3.400.

9. The optical imaging lens of claim 8, wherein D12t32 is defined as a distance from the image-side surface of the first lens element to the image-side surface of the third lens element along the optical axis, D51t62 is defined as a distance from the object-side surface of the fifth lens element to the image-side surface of the sixth lens element along the optical axis, D32t51 is defined as a distance from the image-side surface of the third lens element to the object-side surface of the fifth lens element along the optical axis, and the optical imaging lens satisfies the relationship:

$$(D12t32+D51t62)/D32t51 \leq 2.100.$$

10. The optical imaging lens of claim 8, wherein Fno is an f-number of the optical imaging lens, D11t32 is defined as a distance from the object-side surface of the first lens element to the image-side surface of the third lens element along the optical axis, T7 is a thickness of the seventh lens element along the optical axis, and the optical imaging lens satisfies the relationship: Fno*D11t32/T7≤4.300.

11. The optical imaging lens of claim 8, wherein D11t32 is defined as a distance from the object-side surface of the first lens element to the image-side surface of the third lens element along the optical axis, G67 is an air gap between the sixth lens element and the seventh lens element along the optical axis, and the optical imaging lens satisfies the relationship: D11t32/G67≤3.400.

12. The optical imaging lens of claim 8, wherein ALT is a sum of nine thicknesses of the nine lens elements from the first lens element to the ninth lens element along the optical axis, EPD is an entrance pupil diameter of the optical imaging lens, D11t32 is defined as a distance from the object-side surface of the first lens element to the image-side surface of the third lens element along the optical axis, and the optical imaging lens satisfies the relationship: 5.000≤(ALT+EPD)/D11t32.

13. The optical imaging lens of claim 8, wherein Fno is an f-number of the optical imaging lens, D11t62 is defined as a distance from the object-side surface of the first lens element to the image-side surface of the sixth lens element along the optical axis, T7 is a thickness of the seventh lens element along the optical axis, T8 is a thickness of the eighth lens element along the optical axis, T9 is a thickness of the ninth lens element along the optical axis, and the optical imaging lens satisfies the relationship: Fno*D11t62/(T7+T8+T9)≤3.600.

14. An optical imaging lens, from an object side to an image side in order along an optical axis comprising: a first lens element, a second lens element, a third lens element, a fourth lens element, a fifth lens element, a sixth lens element, a seventh lens element, an eighth lens element and a ninth lens element, the first lens element to the ninth lens element each having an object-side surface facing toward the object side and allowing imaging rays to pass through as well as an image-side surface facing toward the image side and allowing the imaging rays to pass through, wherein:

a periphery region of the image-side surface of the third lens element is concave;
a periphery region of the object-side surface of the fifth lens element is concave;
an optical axis region of the object-side surface of the sixth lens element is convex;
an optical axis region of the object-side surface of the seventh lens element is concave; and
an optical axis region of the image-side surface of the ninth lens element is concave and a periphery region of the image-side surface of the ninth lens element is convex;
wherein lens elements included by the optical imaging lens are only the nine lens elements described above, ALT is a sum of nine thicknesses of the nine lens elements from the first lens element to the ninth lens element along the optical axis, EPD is an entrance pupil diameter of the optical imaging lens, D11t32 is defined as a distance from the object-side surface of the first lens element to the image-side surface of the third lens element along the optical axis, an Abbe number of the eighth lens element is ν8 and an Abbe number of the ninth lens element is ν9 to satisfy ν8+ν9≤100.000 and 5.000≤(ALT+EPD)/D11t32.

15. The optical imaging lens of claim 14, wherein D41t62 is defined as a distance from the object-side surface of the fourth lens element to the image-side surface of the sixth lens element along the optical axis, G67 is an air gap between the sixth lens element and the seventh lens element along the optical axis, and the optical imaging lens satisfies the relationship: D41t62/G67≤3.600.

16. The optical imaging lens of claim 14, wherein D12t32 is defined as a distance from the image-side surface of the first lens element to the image-side surface of the third lens element along the optical axis, D51t62 is defined as a distance from the object-side surface of the fifth lens element to the image-side surface of the sixth lens element along the optical axis, T8 is a thickness of the eighth lens element along the optical axis, and the optical imaging lens satisfies the relationship:

$$(D12t32+D51t62)/T8 \leq 3.500.$$

17. The optical imaging lens of claim 14, wherein AA15 is a sum of five air gaps from the first lens element to the sixth lens element along the optical axis, T6 is a thickness of the sixth lens element along the optical axis, G67 is an air gap between the sixth lens element and the seventh lens element along the optical axis, and the optical imaging lens satisfies the relationship: (AA15+T6)/G67≤2.500.

18. The optical imaging lens of claim 14, wherein HFOV stands for the half field of view of the optical imaging lens, D12t62 is defined as a distance from the image-side surface of the first lens element to the image-side surface of the sixth lens element along the optical axis, and the optical imaging lens satisfies the relationship:

$$13.000 \text{ degrees/mm} \leq HFOV/D12t62.$$

19. The optical imaging lens of claim 14, wherein TL is a distance from the object-side surface of the first lens element to the image-side surface of the ninth lens element along the optical axis, D12t32 is defined as a distance from the image-side surface of the first lens element to the image-side surface of the third lens element along the optical axis, D51t62 is defined as a distance from the object-side surface of the fifth lens element to the image-side surface of the sixth lens element along the optical axis, and the optical imaging lens satisfies the relationship:

$$5.700 \leq (EPD+TL)/(D12t32+D51t62).$$

* * * * *